United States Patent
Razin et al.

[11] Patent Number: 6,098,034
[45] Date of Patent: Aug. 1, 2000

[54] METHOD FOR STANDARDIZING PHRASING IN A DOCUMENT

[75] Inventors: Ely Y. Razin; Sean P. Engelson, both of Jerusalem, Israel

[73] Assignee: Expert Ease Development, Ltd., Jerusalem, Israel

[21] Appl. No.: 08/617,222

[22] Filed: Mar. 18, 1996

[51] Int. Cl.[7] .................................................. G06F 17/38
[52] U.S. Cl. .............................. 704/9; 707/530; 707/540
[58] Field of Search ............................... 701/1–2, 9, 4–5; 707/531, 540, 530–533; 395/709

[56] References Cited

U.S. PATENT DOCUMENTS

| | | | |
|---|---|---|---|
| 5,060,154 | 10/1991 | Duncan, IV | 707/533 |
| 5,077,668 | 12/1991 | Doi | 704/1 |
| 5,257,186 | 10/1993 | Ukita et al. | 704/1 |
| 5,384,703 | 1/1995 | Withgott et al. | 704/2 |
| 5,511,159 | 4/1996 | Baker et al. | 345/326 |
| 5,627,748 | 5/1997 | Baker et al. | 707/531 |
| 5,638,543 | 6/1997 | Pedersen et al. | 704/1 |
| 5,640,575 | 6/1997 | Maruyana et al. | 704/4 |

OTHER PUBLICATIONS

Masek, William J. and Paterson, Michael S. (1980) "A Faster Algorithm Computing String Edit Distances", Journal of Computer and System Sciences 20:18–31 (Exhibit 1).

Sellers, Peter H. (1980) "The Theory and Computation of Evolutionary Distances: Pattern Recognition", Journal of Algorithms 1:359–373 (Exhibit 2).

Manber, Udi and Gene Meyers. (1993) "Suffix Arrays: A New Method for On–Line String Searches", SIAM J. Comput. 22:935–948 (Exhibit 3).

Ukkonen, Esko. (1992) "Approximate String–Matching with q–grams and Maximal Matches", Theoretical Computer Science, 92:191–211 (Exhibit 4).

Ukkonen, Esko. "Approximate–String–Matching Techniques Over Suffix Trees", Department and Computer Science, University of Helsinki, 229–242 (Exhibit 5).

Ukkonen, Esko and Derick Wood (1993) "Approximate String Matching With Suffix Automata", Algorithmica 10:353–364 (Exhibit 6).

Apostolico, A. and F.P. Preparata. (1983) "Optimal Off–Line Detection of Repetitions in a String", Theoretical Computer Science 22:297–315 (Exhibit 7).

Galil, Z. and R. Giancarlo. (1988) "Data Structures and Algorithms for Approximate String Matching", Journal of Complexity 4:33–72 (Exhibit 8).

Galil, Zvi and Raffaele Giancarlo. (1987) "Parallel String Matching with k Mismatches", Theoretical Computer 51:341–348 (Exhibit 9).

Galil, Zvi and Kunsoo Park. "An Improved Algorithm for Approximate String Matching", Department of Computer Science, Columbia University and Department of Computer Science, Tel–Aviv University 394–404 (Exhibit 10).

Jokinen, Petteri and Esko Ukkonen. "Two Algorithms for Approximate String Matching in Static Texts", Department of Computer Science, University of Helsinki 240–248 (Exhibit 11).

(List continued on next page.)

*Primary Examiner*—Forester W. Isen
*Assistant Examiner*—Patrick N. Edouard
*Attorney, Agent, or Firm*—Cooper & Dunham, LLP

[57] ABSTRACT

A method for standardizing phrases in a document includes the steps of identifying phrases of a document to create a preliminary list of standard phrases; filtering the preliminary list of standard phrases to create a final list of standard phrases; identifying candidate phrases of the document which are similar to the standard phrases; confirming whether a candidate phrase of the document is sufficiently proximate to the standard phrase to constitute an approximate phrase; and computing a phrase substitution to determine the appropriate conformation of standard phrase to the approximate phrase or the approximate phrase to the standard. Further this invention relates to a computer system for standardizing a document.

20 Claims, 8 Drawing Sheets

OTHER PUBLICATIONS

Knuth, Donald E. et al. (1977) "Fast Pattern Matching in Strings", SIAM J. Comput. 6:323–350 (Exhibit 12).

Landau, Gad M. and Uzi Vishkin. (1986) "Efficient String Matching with k Mismatches", Theoretical Computer Science 43:239–249 (Exhibit 13).

Tarhio, Jorma and Esko Ukkonen. (1993) "Approximate Boyer–Moore String Matching", SIAM J. Comput. 22:243–260 (Exhibit 14).

Tarhio, Jorma and Esko Ukkonen. "Boyer–Moore Approach to Approximate String Matching", Department of Computer Science, University of Helsinki, 348–359 (Exhibit 15).

Ukkonen, Esko. (1985) "Algorithms for Approximate String Matching", Department of Computer Science, University of Helsinki, 100–118 (Exhibit 16).

Ukkonen, Esko. (1985) "Finding Approximate Patterns in Strings", Journal of Algorithms, 6:132–137 (Exhibit 17).

Ukkonen, Esko. "On Approximate String Matching", Department of Computer Science, University of Helsinki, 487–195 (Exhibit 18).

Weiner, Peter. "Linear Pattern Matching Algorithms", The Rand Corporation, Santa Monica, California, 1–11 (Exhibit 19).

Wagner, Robert A. and Michael J. Fischer. (1974) "The String–to–String Correction Problem", Journal of the Association for Computing Machinery, 21:168–173 (Exhibit 20).

Lowrance, Roy and Robert A. Wagner. (1975) "An Extension of the String–to–String Correction Problem", Journal of the Association for Computing Machinery, 22:177–183 (Exhibit 21).

Andersson, Arne, et al. (1995) "Suffix Trees on Words", Department of Computer Science, Lund University, 1–14 (Exhibit 22).

Andersson, Arne and Stefan Nillson. (1995) "Efficient implementation of Suffix Trees", Software–Practice and Experience, 25:129–141 (Exhibit 23).

McCreight, Edward M. (1976) "A Space–Economical Suffix Tree Construction Algorithm", Journal of the Association for Computing Machinery, 23:262–272 (Exhibit 24).

Fox, Christopher. "Lexical Analysis and Stoplists", AT&T Bell Laboratories, 102–130 (Exhibit 25).

Frakes, W.B. "Stemming Algorithms", Software Engineering Guild, 131–160 (Exhibit 26).

Boyer, Robert S. and J. Strother Moore. (1977) "A Fast String Searching Algorithm", Communications of the ACM, 20:762–772 (Exhibit 27).

KEY

Seq [1] = Sequence to add to trie

Child (v,C) = Child of V whose label starts with C

Label (v) = $C_K$.............$C_L$ = Label of v

Common prefix = $(S_1, S_2, S, S_1', S_2')$ = longest S such that $S_1 = SS_1'$
$S_2 = SS_2'$ Seq [it] = Subsequence of sequence starting at position i

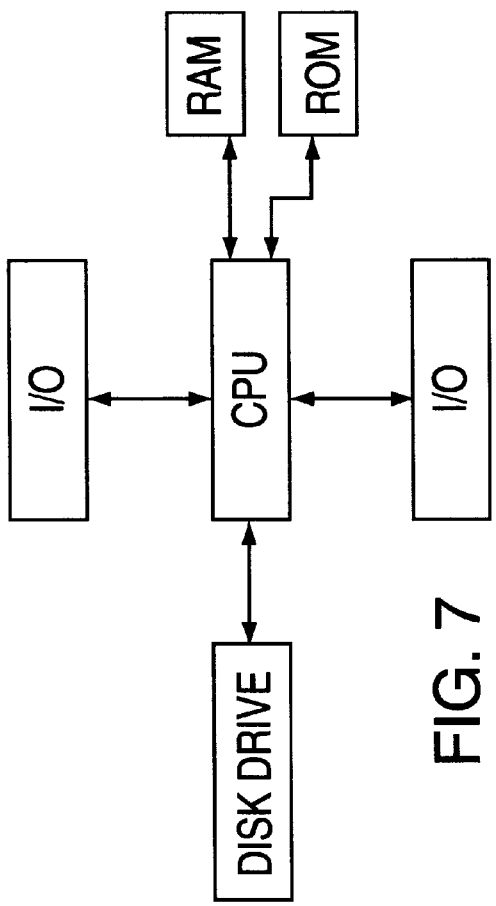
FIG. 7
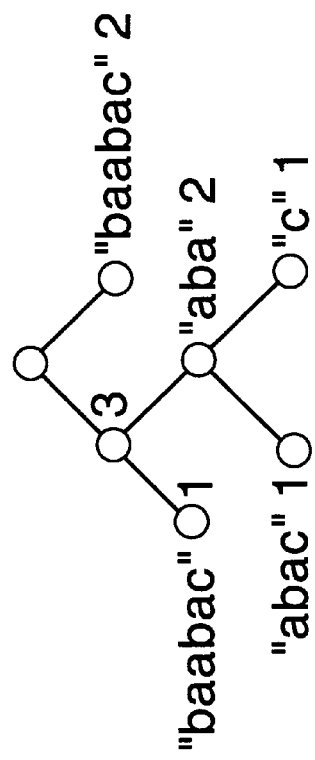
FIG. 10
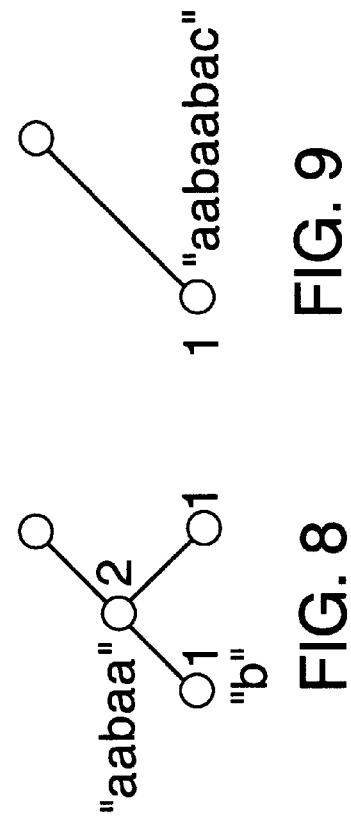
FIG. 9
FIG. 8

METHOD FOR STANDARDIZING PHRASING IN A DOCUMENT

BACKGROUND OF THE INVENTION

The problem addressed by this application is the identification in a document of user significant phrases, as indicated by repetition of particular sequences of words. Typically, in documents created by precision-oriented users of various sorts, certain groups of words are used to convey a particular idea. Each time the user desires to express that idea, the user prefers to utilize the same phrasing over others in order to avoid confusion of meaning. In order to determine whether a significant phrase has already been used in the documents, the user must review the document to extract the relevant sequence of words. Once a phrase has been extracted, the user may refer to it on a continual basis to ensure that, whenever that user desires to express a similar idea, a form of the extracted sequence of words is used.

Problems related to, and auxiliary to, the problem of extracting user-created standard phrases include: the identification of significant sequences of words nested within otherwise significant sequences of words; and establishing equivalence of nearly identical sequences of words where the only difference among the sequences relates to certain known, structural elements. Problems related to, and auxiliary to, the problem of extracting user-created phrases that are substantially similar to user-created standard phrases include: the computation of the phrase(s) that transform the substantially similar phrase into the user-created standard phrase or that transform the user-created standard phrase into the substantially similar phrase, standardizing the discrepancies of the two phrases while retaining the remainder of the attributes and content of the conformed phrase.

The problem of standardizing phrasing, as described above, is one currently performed only manually. The human user conducts a time-consuming review of a document for significant phrases. This review is made in an attempt to detect the standard way of phrasing an idea in order to ensure continued phrasing of that idea in a manner that conforms to earlier phrasing.

Further, the human reviewer seeks to identify similar yet non-identical phrases in order to conform them. There is generally no explicit extraction and designation of standard phrases; these phrases are left within their contexts and simply used as the standards to which similar expressions must conform. Similarly, there is no explicit extraction and designation of phrases substantially similar to standard phrases. These phrases are also left within their contexts and are either conformed to the significant phrases to which they are substantially similar or are used as the master phrasing to which other similar phrases are standardized, including even the phrasing that constitutes the user standard phrasing.

The construction of a suffix tree for a given element is a method of representing every distinct sub-sequence of items constituting a suffix of that element. This representation is heavily utilized in dictionary storage and compression, used in, among other things, spelling checkers. This representation enables compressed storage of the element represented on the tree and is typically used on the level of character strings, not words. The subject invention uses inter alia aspects of a modified suffix tree representation. However, the suffix tree constructed for this application is based on stemmed words and abstracted known elements, not character strings. Word-level representation is significant for two reasons: First, words, and not individual characters, are the natural atomic units of phrases. Second, higher level word-based analysis is more efficient than lower level character-based analysis.

In addition, the suffix tree is usually used for the applications of storage, compression, and searching. In the subject application, the tree is used not for document or phrase storage, but rather for phrase identification by establishing word sequences that satisfy the criteria for length and recurrence in the document. In more detail, each node of the tree is associated with a record of the number of occurrences of the word sequence at that node; any such word sequence of sufficient length, where the number of occurrences exceeds the required threshold, is preliminarily designated a phrase. Inclusion on the final phrase list follows the post-processing steps outlined below.

The tree also serves to signal the occurrence of nested phrases wholly within and at the beginning of a nesting phrase. These phrases may be located on the suffix tree at no extra cost to efficiency or complexity. Such prefix phrases may be standard phrases in their own right, but in order to be designated as such, they must be of sufficient length and must occur independently of the nesting phrase a certain number of times.

An algorithm for the construction of a word-based suffix tree has been published by Andersson, et al. (Andersson, A. Larsson Jesper N. Swanson, K. "Suffix Tree on Words," Department of Computer Science, Lund University, Jul. 12, 1995.) Andersson, et al. is neither related to nor contains aspects related to the subject invention because Andersson does not relate at all to the overall process that is the subject of this application, standardizing document phrasing. Further, Andersson deals only with the construction of a word-level suffix tree; it does not relate at all to the process of standard phrase extraction. Further, Andersson constructs its word-based suffix tree on the level of the entire document and does not innovate the sentence suffix tree structure that enables the subject method its unique combination of efficiency and non-complexity. Further, Andersson does not attempt to pre-process the text at all through stemming and abstraction of known characters. Lastly, Andersson, does not address the related problem of nested phrases or any resolution thereof.

SUMMARY OF THE INVENTION

The subject invention is a method for standardizing user phrasing in a user-created document. This method involves two separate components, each of which is further divided into separate steps. The first component involves the automatic extraction from the document of sequences of words constituting significant user phrases. This is accomplished through the combination of document pre-processing, the representation and analysis of the document text on a modified suffix tree, and heuristic post-processing. The second component involves the automatic extraction from the document of sequences of words that are significantly similar but not identical to significant user phrases, and the automatic generation of suggested phrasing for this approximately matched phrasing that conforms its phrasing to the standard. This is accomplished through a combination of the location of candidate word sequences, a computation of the weighted "edit distance" between the significant phrase and the phrase approximately similar to it, and certain natural language processing techniques. The overall result of this method is a list of significant user-created standard phrases and the standardization of approximately matched phrasing throughout the document.

BRIEF DESCRIPTION OF THE FIGURES

FIG. 7: Block diagram of computer system for standardizing the phrasing of a document.

FIG. 8: Diagram of tree of prefix phrase nested within a larger phrase.

FIG. 9: Diagram of suffix tree.

FIG. 10: Diagram of intermediate step in suffix tree.

DETAILED DESCRIPTION OF THE INVENTION

Figure 1:
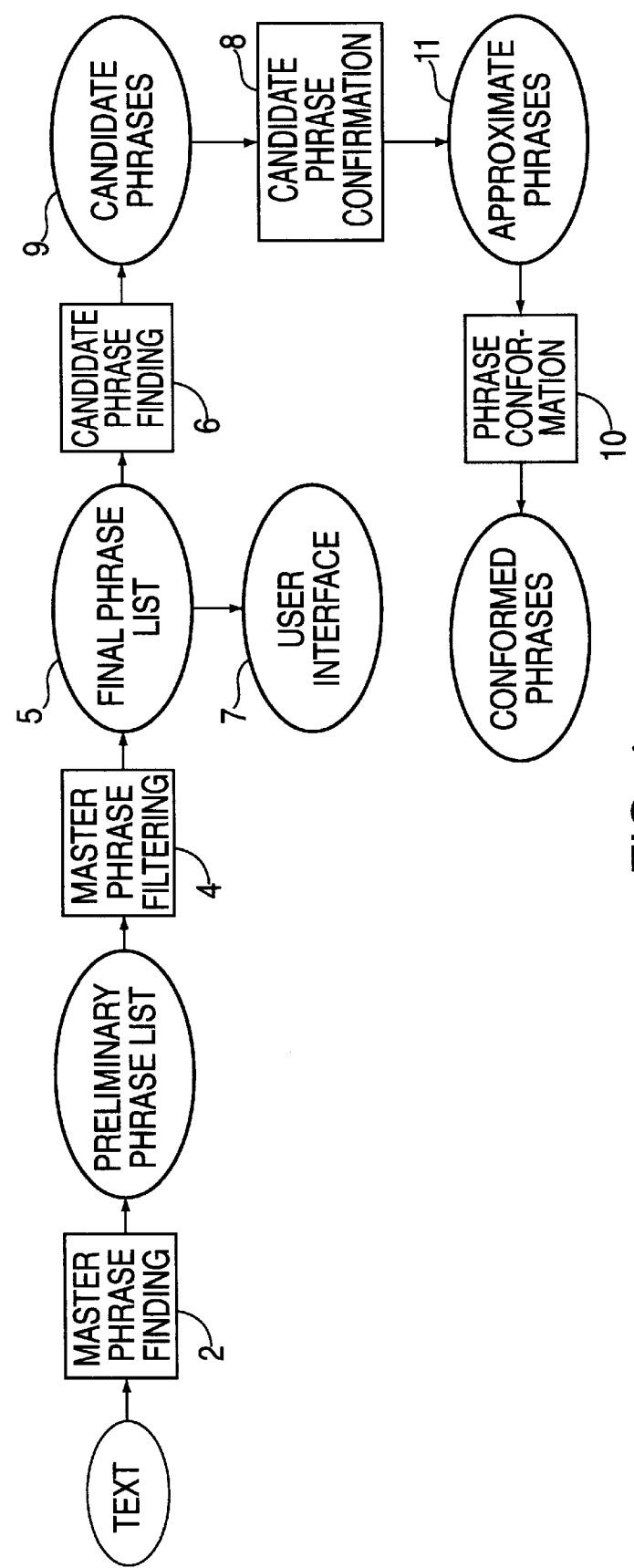
FIG. 1: Process data flow diagram of process of standardizing a document.

The present invention relates to a method for standardizing phrases in a document, which comprises the steps of: identifying phrases of a document to create a preliminary list of standard phrases; filtering the preliminary list of standard phrases to create a final list of standard phrases; identifying candidate phrases of the document which are similar to the standard phrases; confirming whether a candidate phrase of the document is sufficiently proximate to the standard phrase to constitute an approximate phrase; and computing a phrase substitution to determine the appropriate conformation of standard phrase to the approximate phrase or the approximate phrase to the standard.

In one embodiment the step of identifying phrases of a document to create a preliminary list of standard phrases further comprises tokenizing the document. In another embodiment of the invention the step of identifying phrases of a document to create a preliminary list of standard phrases further comprises constructing sentence suffix trees for determination of standard phrases. In another embodiment of the invention the step of identifying phrases of a document to create a preliminary list of standard phrases further comprises traversing and analyzing the suffix tree. In another embodiment the step of identifying phrases of a document to create a preliminary list of standard phrases further comprises the application of a stop list.

The high level design of the first component of the process, the automatic extraction of standard, user phrases, is centered around the construction of a modified suffix tree in which stemmed words are the atomic units; this tree is traversed and analyzed to identify sequences of words meeting certain pre-set criteria for significant phrases. The use of the suffix tree is supplemented by several additional steps that, together, enhance the accuracy and efficiency of the process, and hence the number of standard phrases found. First, the processes of stemming, application of a stop list, and abstraction for known structural elements integrate information retrieval and other techniques to ignore elements of the document that do not affect the overall meaning of the sequence of words. These processes thus broaden the candidate group of phrases. Second, effectiveness is further enhanced by the post-construction processes of eliminating nested sub-phrases that do not occur sufficiently frequently independent of their nesting phrases. Finally, validity of the extracted phrase is supplemented by eliminating dangling minimal content words.

As a result of these additional processes, the extraction of standard phrases by the process is not compromised by differences in pluralization, capitalization and conjugation nor by the use of differing minimal content words, nor is it affected by variations in usage of certain structural elements.

Certain processing is conducted in connection with the suffix tree in order to heighten the accuracy and efficiency of the phrase finding. First, there are certain structural elements in a document, detailed herein, that are known to be structural in nature and do not affect the meaning of the surrounding sequences of words. As these words do not serve to supplement or modify the meaning of the sequences of words preceding or following them, they are abstracted in the construction of the suffix tree; at any point where a given type of structural element appears, a marker is inserted to indicate the type of element and to hold the element's place. This enables the process to treat sequences of words, similar in all respects other than the presence of these known structural elements, as standard phrases. This improves the inclusiveness and accuracy of the results.

Second, the words contained in the text to be analyzed are stemmed to their canonical forms (e.g., "companies" becomes "company" and "sold" becomes "sell"). This enables the process to recognize similar sequences of root words, and to designate these sequences as standard phrases, where the actual words may differ in conjugation, pluralization or capitalization. Once again, this improves the inclusiveness and accuracy of the results.

Third, the usage of stop lists, a technique commonly utilized in information retrieval (but not in pattern matching), is integrated in the subject process to further heighten its accuracy. The stop list built into this process contains minimal content words that do not significantly affect the meaning of the sequence of words under analysis; these minimal content words include many prepositions, articles and conjunctions. Words contained on the stop list are not analyzed on the suffix tree. This prevents the process from finding frequently-repeated "phrases" consisting wholly or mostly of semantically insignificant words (e.g., "and then about the").

In one embodiment the step of filtering the preliminary list of standard phrases to create a final list of standard phrases further comprises identifying prefix nested phrases. In another embodiment of the subject invention the standarding method further comprises indentifying suffix nested phrases. In another embodiment of the subject invention the step of filtering the preliminary list of standard phrases to create a final list of standard phrases further comprises eliminating duplicative nested phrases from the final phrase list. In another embodiment of the invention the step of filtering the preliminary list of standard phrases to create a final list of standard phrases further comprises post-processing of the standard phrase. In another embodiment of the subject invention the step of filtering the preliminary list of standard phrases to create a final list of standard phrases further comprises eliminating dangling words.

Following the analysis of the suffix tree to extract phrase candidates, certain additional processing is added to heighten the accuracy of the phrase finding. First, the phrases identified on the suffix tree are sorted and reviewed in order to determine whether any phrase is wholly nested within any other phrase. Such nested phrases may be standard phrases in their own right, but in order to be designated as such, they must be of sufficient length and must occur outside the nesting phrase a certain number of times. Further, phrases may be multiply nested within an overall nesting phrase. As a result, where there is one sequence of words wholly nested within a larger sequence and the nested sequence does not meet the criteria for length and recurrence, it will not be considered a significant phrase; however, a third sequence of words, wholly nested within the first two, may still be designated a standard phrase if it meets these criteria.

Second, a final post-processing step is applied to the preliminary phrases contained on the standard phrase list. Where these phrases are either preceded or followed by dangling minimum-content words, these words are removed from inclusion as part of the standard phrase. This increases not the accuracy, but rather the validity of the final phrases.

The high level design of the second component of the process, the extraction of user-created phrases that are substantially similar to standard user-created phrases, is centered around a calculation of minimal "edit distance." The use of the edit distance calculation is supplemented by a pre-processing step that greatly enhances the efficiency of the method.

In one embodiment the step of identifying candidate phrases of the document which are similar to the standard phrases of the above invention the standardizing method further comprises constructing of a dictionary and phrase index. In another embodiment of the subjetc invention the step of identifying candidate phrases of the document which are similar to the standard phrases further comprises identifying candidate phrases by searching for approximate matches. In another embodiment of the subject invention the step of identifying candidate phrases of the document which are similar to the standard phrases further comprises application of a shifting window. In another embodiment of the subject invention the step of identifying candidate phrases of the document which are similar to the standard phrases further comprises accumulation of counts. In another embodiment of the subject invention the step of identifying candidate phrases of the document which are similar to the standard phrases further comprises generating candidates.

The dictionary of standard phrases that forms the basis of the determination of substantial similarity, termed the "Dictionary," is broken down into two coordinating data structures. These structures include both a list of phrases and a character-based "Phrase Index" containing all the characters, stemmed words and locations of these stemmed words contained in the list of phrases. This dual-structured dictionary enables efficiency in comparing the text under analysis to the standard phrases and, in particular, filtration of the document in order to locate candidate word sequences that may be substantially similar to a user-created standard phrase. These candidate phrases are not necessarily substantially similar to the standard; they simply meet certain word usage criteria that make them worthy of further analysis via the edit distance calculation. As the edit distance computation is time-consuming, this filtration phase is necessary in order to markedly reduce the number of phrases for which edit distance is to be calculated. This finding of candidate phrases is accomplished through the traversal of the text by a "sliding window," seeking units of text containing certain words in common with the words contained in the dictionary of standard phrases. Where a sufficiently large number of words is found in common, irrespective of the order of their appearance, the sequence of words is designated a candidate phrase, deserving of further analysis by the time-intensive edit distance calculation.

Confirmation of the similarity of candidate phrases is accomplished by an edit distance calculation which is a method for quickly calculating the number of operations necessary to perform on object 1 in order to transform it into object 2. The operations computed to determine the edit distance include insertion, deletion and replacement. The calculation enables identification of the item most closely matching the object or objects under analysis.

The use of the edit distance calculation is employed in the following manner. First, the edit distance calculation is based on stemmed words, not character strings. As noted above, word level analysis is significant, both because words are the natural atomic units of phrases and because word level analysis is faster than character-level analysis. Further, the words are stemmed in order to arrive at their canonical forms. As noted earlier, this improves accuracy by accounting for morphological variation.

Second, the edit distance measurement in the subject method is oriented toward recommending conformation, and is not oriented toward recommending the replacement of one item by a second, objectively correct item, e.g. the spelling of a word. In the context of phrasing, there is not necessarily an objectively correct phrase. As a result, the transformation of either one of the two approximately similar phrases, one the user-created standard phrase, the other the phrase substantially similar to it, may be desired. Regardless of the option selected, only the discrepancies between the two phrases are transformed, while the remainder of the attributes and content of the conformed phrase are retained, in order to ensure the syntactic coherence of the document.

Third, measurement of edit distance utilizing stemmed words as atomic units permits a weighted edit distance calculation. As the significance of each insertion, deletion and replacement may be different each may be differently weighted to indicate this difference in significance. Further, to a degree greater than is true of characters, words are characterized by various attributes that permit further gains in the accuracy of assessing edit distance. Specifically, the lexical attributes, syntactic attributes, structural attributes and semantic attributes of words may be differently weighted so that the significance of the operations measured by the edit distance calculation is reduced or inflated depending on certain attribute measures.

In one embodiment of the step of confirming whether a candidate phrase of the document is sufficiently proximate to the standard phrase to constitute an approximate phrase the standardizing method further comprises calculating the edit distance of candidate phrases. In another embodiment of the invention the standardizing method further comprises calculating the edit distance of candidate phrases. In another embodiment of the invention the standardizing method further comprises substituting conforming phrases. In another embodiment of the invention the standardizing method further comprises weighting the edit distance.

In one embodiment of the step of computing a phrase substitution to determine the appropriate conformation of standard phrase to the approximate phrase or the approximate phrase to the standard further comprises conforming the document for grammer. In another embodiment the standardizing method further comprises recommending a phrase that conforms the candidate phrase to the user standard phrase , while otherwise retaining the syntactic and grammatical coherence of the candidate phrase. In another embodiment the standardizing method further comprises computing a recommended phrase that conforms the user standard phrase to the candidate phrase, while otherwise retaining the syntactic and grammatical coherence of the candidate phrase.

In addition, in another embodiment of the above invention the standardizing method further comprises presenting a user with recommended phrases computed for editing and user approved insertion in the document.

"Abstraction" is defined as the process of replacing a sequence of words that constitute a known structural element with a marker representing the type of that element. "Approximate phrase" is defined as a sequence of words in a document whose edit distance from a known master phrase is below the given edit distance threshold. "Attribute" is defined as a category label associated with a word. "Canonical form" is defined as the standardized, "dictionary entry" form of a word, created by removing grammatical appendages such as conjugations or declensions. For example, the canonical form of "sold" is "sell" and that of "children" is "child".

Further, "conform" is defined as the process of editing an approximate phrase to correspond to its matching master phrase, or vice versa, retaining the grammatical structure of the source phrase as much as possible. "Conformed phrase occurrence" is defined as the word sequence resulting from automatically conforming an approximate phrase or a user standard phrase. "Domain" is defined as a particular field of discourse having its own specialized terminology and types of documents, e.g., law, software engineering, etc. "Edit distance" is defined as a measure of the distance between two sequences of words, consisting of a count of the number of word insertions, deletions, and replacements needed to transform one sequence to the other. "Edit distance threshold" is defined as a number giving the largest edit distance between a master phrase and another phrase, such that the second phrase will be considered an approximate phrase for the master phrase.

Further, "encoding" is defined as the process of transforming a sequence of words into a sequence of numbers, where each number represents a particular word (the word's code). "Lexical attribute" is defined as an attribute indicating if a particular word has independent meaning, or if its meaning is only in its grammatical function. "Master phrase" is defined as a word sequence constituting a standardized phrasing for a document. "Nested phrase" is defined as a pair of phrases P and P', such that the sequence of words in P' occurs as a subsequence of the sequence of words in P. P' is nested in P. Trie"is defined as a tree, each of whose nodes is labeled by a sequence of elements (e.g., characters or words), where each node represents the string formed by concatenating the labels of its ancestors starting with the root and ending with the label of the node itself". "Path compressed trie" is defined as a trie where no node has exactly one child. "Phrase" is defined as a sequence of words in canonical form constituting phrasing. "Prefix nested phrase" is defined as a nested phrase where the shorter phrase's word sequence is a prefix of the longer phrase's word sequence. "Segmentation" is defined as the process of converting a document represented as a sequence of characters into a sequence of sentences, each comprising a sequence of words.

Further, "semantic attribute" is defined as an attribute categorizing a sequence of words according to its meaning. For example, "Ab Def Inc." may be categorized as a "company name". Semantic categories may be organized in a hierarchy, with higher-level categories including many lower-level categories; a word is considered to have all semantic attributes whose categories it is included in. Note that in contradistinction to lexical attributes, semantic attributes may apply to sequences of several words. "Sentence suffix tree" is defined as a trie representing the set of sequences comprising all of the Suffixes of all of the sentences in a given document. "Structural element" is defined as a word, or sequence of words, in a document that serve a unified functional purpose in the document, independent of the words' individual meanings. In a particular domain, different types of structural elements will exist. For example, in the domain of legal documents, one type of structural element is the "defined term", corresponding to usage of a term defined elsewhere in the document. Identifying structural elements and their types in a document may be done either manually or automatically, through the use of domain-dependent methods. "Stemming" is defined as the process of reducing a word to its canonical form. "Stop list" is defined as a list of frequently used words which bear minimal content on their own (such as conjunctions or prepositions). "Suffix tree" is defined as path compressed trie which represents exactly the set of sequences comprising the distinct suffixes of a given sequence of elements.

Further, "syntactic attribute" is defined as an attribute giving a word's syntactic function. For example, in English text, this may be as simple as a part-of-speech label ("noun", "verb", etc.) or a more complex descriptor based on the word's relationship to other surrounding words. "Template replacement" is defined as a method of the automatic conforming, where for a certain type of words, the approximate phrase's word is retained and not replaced by the corresponding word in a master phrase (for example conjunctions—"and" cannot be replaced by "or"). "Tokenization" is defined as the process of converting a document into a sequence of sentences, including the processes of segmentation, abstraction, stemming, and encoding. "Weighted edit distance" is defined as a variety of edit distance where the operations of insertion, deletion, and replacement are weighted differently, possibly according to the attributes of the words being compared.

In addition, the present invention relates to a computer system for standardizing a document, comprising a computer containing an executable standardizing document program in which such program imparts conforming functionality to the computer by changing the state of the computers logic unit upon execution.In another embodiment the computer program is stored on the computer hardware, software or in RAM. In the preferred embodiment the computer program is the process of standardizing a document as described herein.

In addition, the present invention relates to a computer system for standardizing a document, comprising: a. a display; b. a memory; c. a microprocessor; d. a storage; e. an input circuit; and f. an output circuit.

In one embodiment the computer system is shown in FIG. 8. In one embodiment the microprocessor includes inter alia the arithmatic logic unit. In another embodiment the microprocessor inlcudes the analysis means for computing a phrase substitution to determine the appropriate conformation of the standard phrase to the approximate phrase or the approximate phrase to the standard phrase.

In one embodiment of the subject application the input means is a modem, mouse, keyboard, stylus and tablet, joystick, microphone, modem, direct memory access, pen, or voice command. Input means are known to those skilled in the art which permit a user to input. In one embodiment of the subject invention the output means is a displsy such as a printer and sound modem. Output means are known to those skilled in the art art. In one embodiment a display is a CRT or monitor. In another embodiment the memory is RAM, ROM, PROM, EPRO, EEPROM program memory or data memory. In one embodiment the storage is a hard disk, floppy disk, optical disk, or tape.

Further, the sotware or hardware may be implemented in conjunction with any of a number of operating systems, inlcuding but not limited to: DOS, Windows, UNIX etc.

The method that is the subject of this application includes five overall phases, as shown in FIG. 1, the Master Phrase Finding Phase 2, the Master Phrase Filtering Phase 4, the Candidate Phrase Finding Phase 6, the Candidate Phrase Confirmation Phase 8, and the Phrase Conformation Phase 10. The Master Phrase Finding Phase assembles a preliminary list of significant phrases from an entire source text. This is accomplished through the use of certain pre-processing techniques, the construction of a modified suffix tree and the traversal and analysis of this tree. The Master Phrase Filtering Phase 4 creates a final list 5 of user standard phrases from this preliminary list, by post processing. This list may be presented to the user, via a user interface 7, for reference purposes, and may be further inserted in the phrase dictionary used in the next two phases.

The Candidate Phrase Finding Phase 6 assembles a preliminary group of word sequences that may be sufficiently similar to the phrases contained in the phrase dictionary (including those phrases extracted, as above, as well as any additional manually input phrases) to constitute candidate phrases 9 that the user may desire to conform to the standard phrase. Finally, the Candidate Phrase Confirmation Phase 8 quickly performs a weighted edit distance calculation on the candidate phrases to determine whether these phrases are sufficiently proximate to the standard phrases to constitute approximately matching phrases 11. If the phrases are determined to match sufficiently well, the Phrase Conformation Phase 10 then utilizes the results of the edit distance calculation in order to compute the proper form to substitute in for either the Master Phrase or the Approximate Phrase. This form attempts to retain as much as possible of the substituted-for phrase's grammatical structure. Once an approximation to the correct substitution form is computed, the user is presented with a candidate phrase for substitution that conforms the discrepancies between the standard phrase and the approximately matching phrase, retaining the syntactic coherence of the conformed phrase.

In more detail, the Master Phrase Finding Phase 2, detailed in FIG. 2 and below, itself consists of several steps. First, the pre-processing step involves the tokenization 12 of the document into sentence-based "word packs", the abstraction of known structural elements within the document, and the stemming of word packs. Second, the determination of phrases involves the construction of the suffix tree, the traversal and analysis of this tree, and the application of a "stop list" of words during this analysis. The output of this Phase is a preliminary list of user-specific phrases.

The Master Phrase Filtering Phase 4, detailed in FIG. 2 and below, performs two important post-processing functions that serve to increase the accuracy of the final phrase list. First, the post-processing eliminates from the phrase list otherwise-significant phrases that are nested within other significant phrases and that do not meet certain criteria. Second, post-processing removes from the final phrase list minimal content words dangling at the beginning or end of preliminary user-specific phrases.

Figure 3:
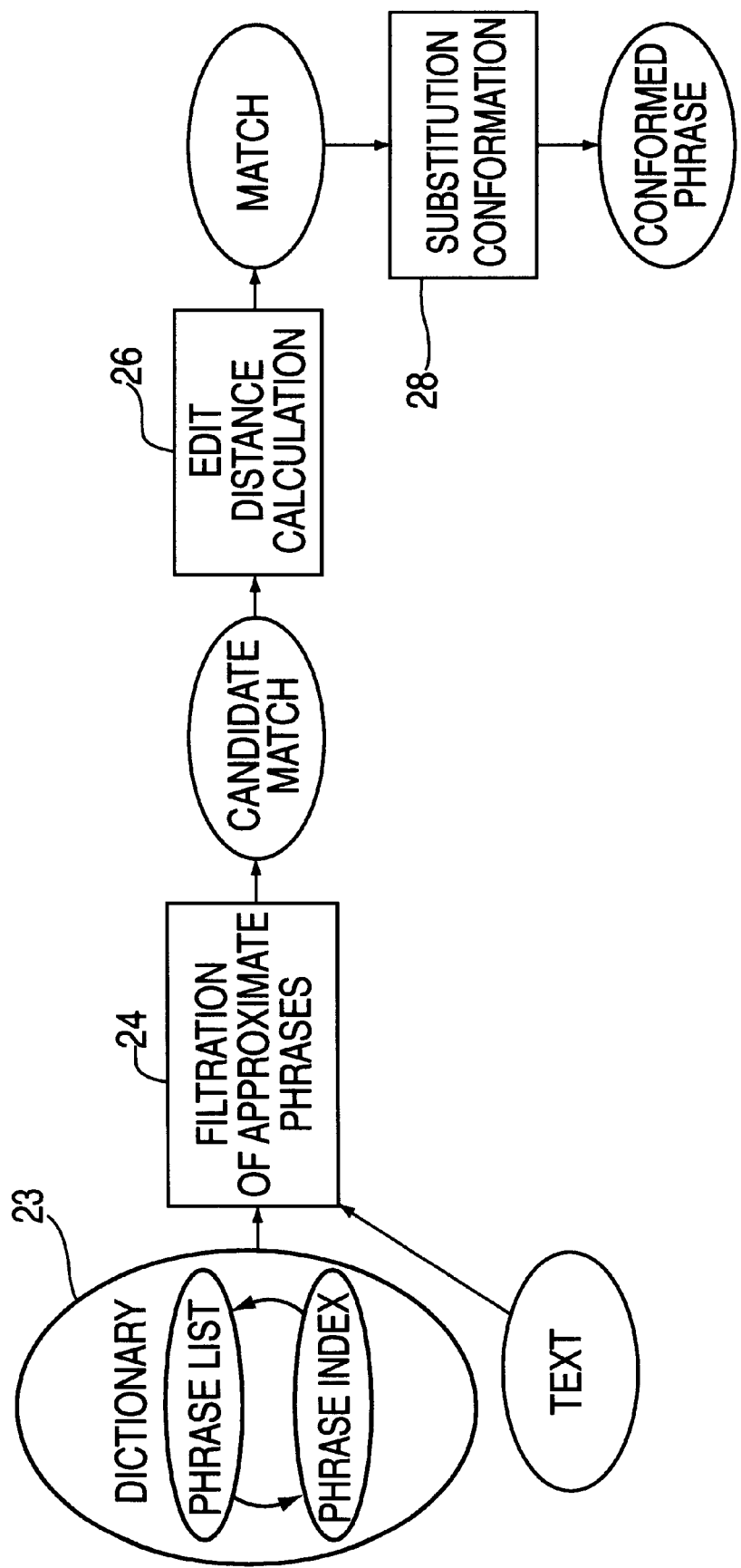
FIG. 3: Flow diagram details of Conforming Phase.

The Candidate Phrase Finding Phase 6, detailed in FIG. 3, and below, consists of several steps that, in the aggregate, limit the number of candidate word sequences by eliminating non-candidate word sequences. This Phase involves the construction of a dual-structured phrase dictionary, including a phrase list and a phrase index. The words contained in the phrase index are continually compared to the text contained in a "sliding window" to determine whether and where there is sufficient similarity between the text contained in the "window" and the phrases contained in the phrase dictionary. The output of this phase is a preliminary list of phrases sufficiently similar to the user-created standard phrases to merit further analysis via the next phase.

The Candidate Phrase Confirmation Phase 6, detailed in FIG. 3 and below, involves the construction of an array representing the minimal edit distance between all prefixes of a user-created standard phrase and the sequence of words under analysis. The edit distance is measured by assigning costs associated with the nature of the operations necessary to transform the prefix into the sequence of words under analysis. These costs are further weighted to properly account for various attributes. The smallest edit distance arrived at by this computation is then compared to a minimum threshold edit distance. Only if this minimum edit distance is not exceeded is the candidate phrase confirmed as an Approximate Phrase that the user may seek to conform. The output of this phase is the Approximate Phrase, if the phrase is determined to match, as well as the sequence of editing operations required to transform the Master Phrase into the Approximate Phrase.

The Phrase Conformation Phase 10, detailed in FIG. 3 and below, then uses this sequence of editing operations to compute a recommended candidate phrase that conforms discrepancies between two phrases, while retaining the grammatical and semantic coherence of the target phrase. This is done by applying the editing operations in order, while applying syntactic and semantic substitution rules. The output is a Conformed Phrase Occurrence which approximates the correct substitution for the target phrase. The user is then given the option to edit the Conformed Phrase Occurrence before substituting it into the document text.

The result of the overall process is the standardization of the phrasing in a user-created document according to the user's own, phrasing choices.

1. The Trie Data Structure

In the first three phases of the subject process (Master Phrase Finding 2, Master Phrase Filtering 4, and Candidate Phrase Finding 6) variations on a certain data structure, the "trie", are used. The following lays out the basic definitions needed for these various data structures used in the sections below.

A set of sequences of elements may be represented in a "trie", which is a tree, each of whose nodes v is labeled by an element label(v), such that each sequence in the set is represented by the labels on a path from the root node to a leaf. All children of a given node have distinct labels; the root's label is NIL.

A trie is "path compressed" if only nodes with more than one child are represented. Paths of nodes with only one outgoing edge are compressed into one node, which is then labeled by the entire sequence of elements from its parent (the parent of the first node in the path) to the last node in the path.

A "suffix tree" is a path compressed trie where the set of sequences represented are all the suffixes of some given source sequence. If the source sequence is divided into a set of "sentences", a "sentence suffix tree" is a trie whose set of sequences represented are all of the suffixes of each sentence in the sequence.

In the subject application, the sequences represented are either sequences of words constituting documents or parts of a document, or sequences of characters, representing individual words.

2. Master Phrase Finding Phase

Figure 2:
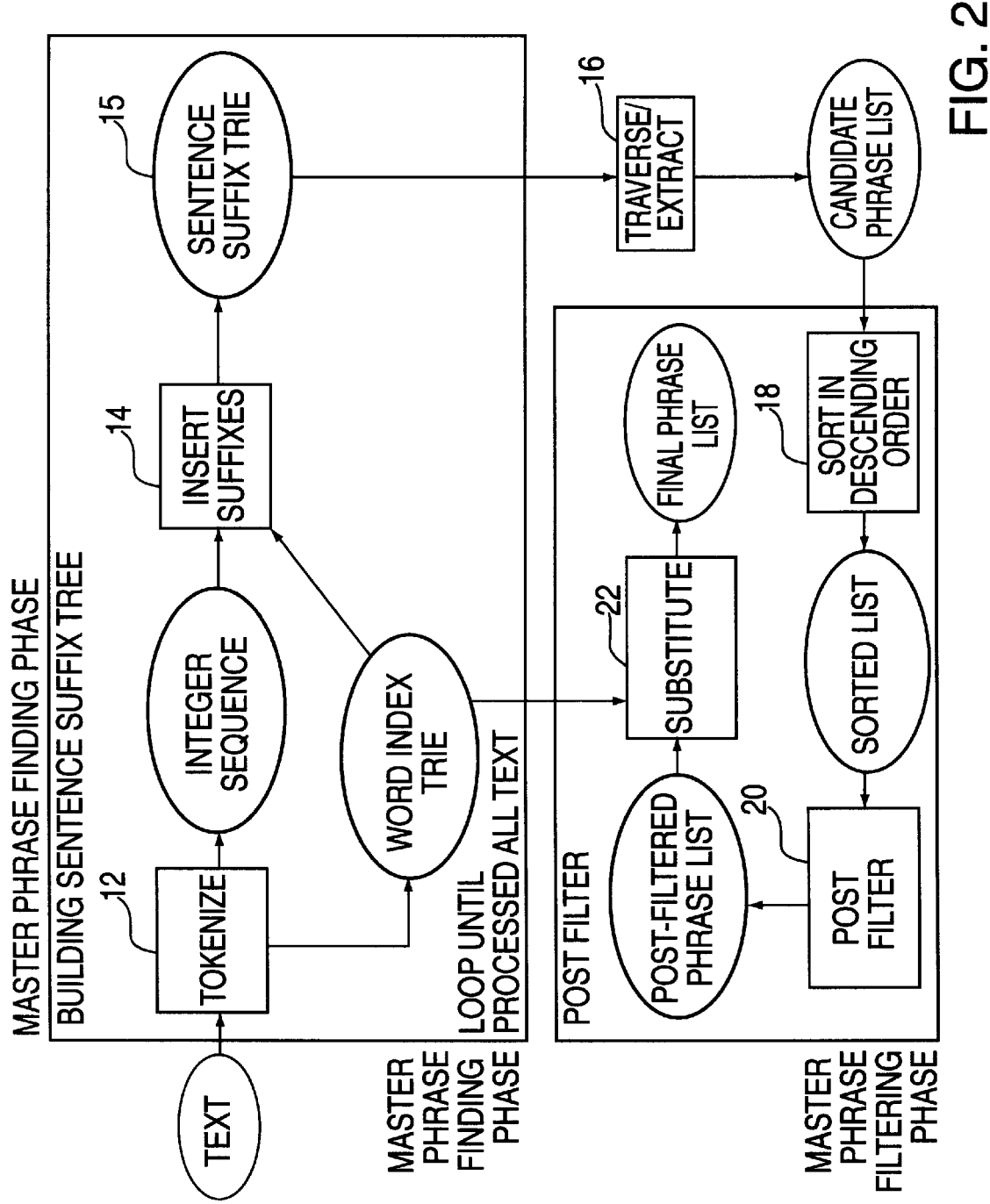
FIG. 2: Flow diagram details of Master Phrase Finding and Filtering Phase.
Figure 6:
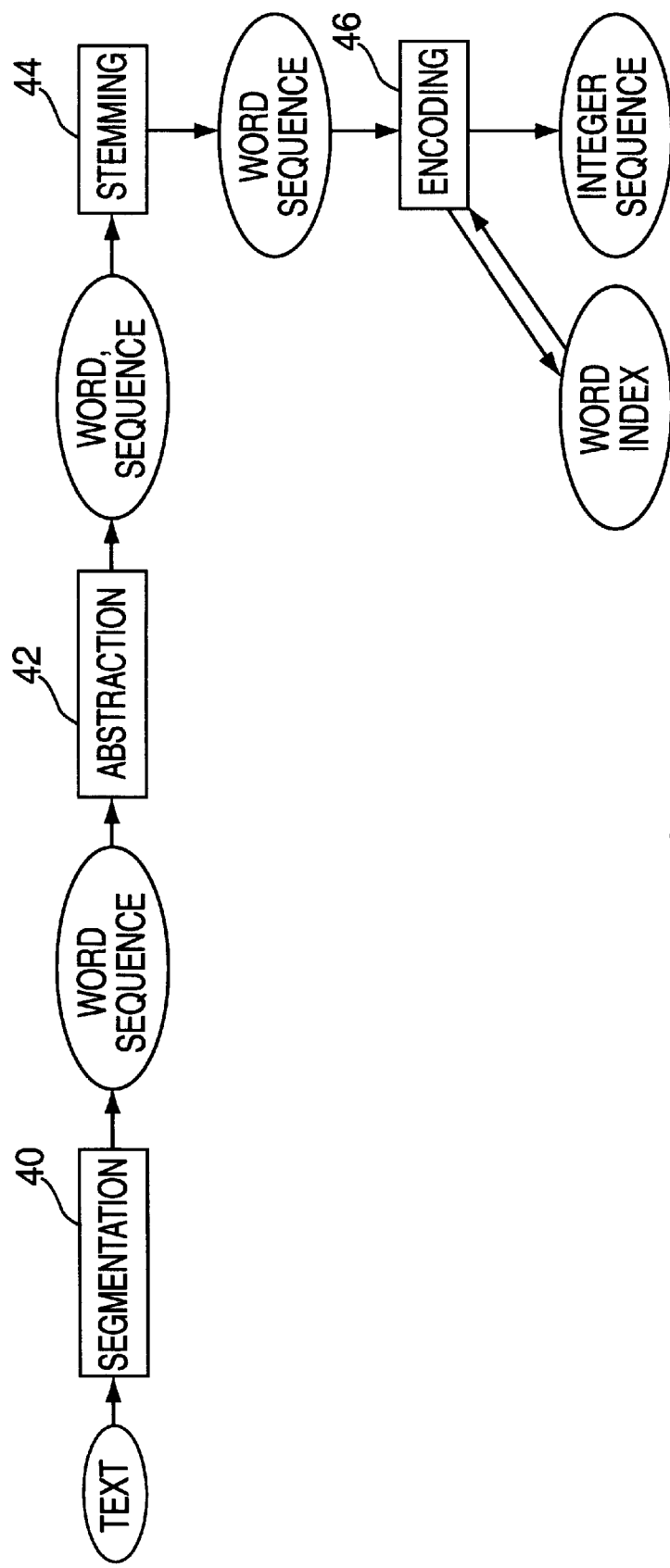
FIG. 6: Flow diagram details of Tokenization Process.
Figure 11:
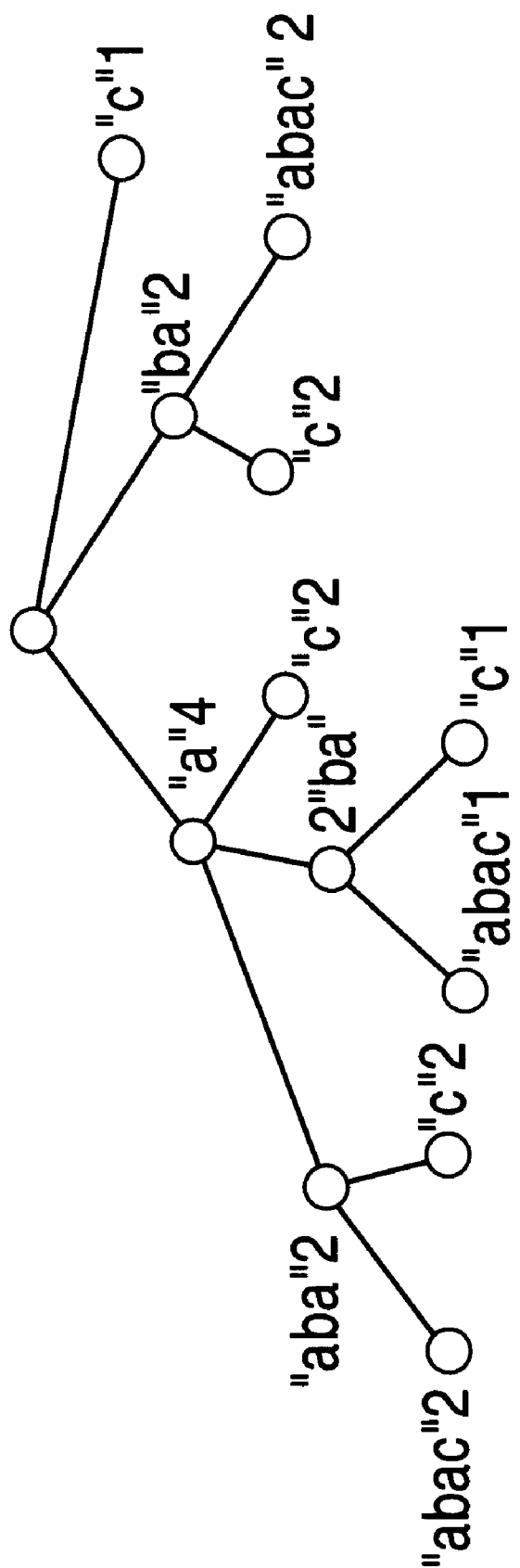
FIG. 11: Diagram of complete suffix tree.

As depicted in FIG. 2, the Master Phrase Finding Phase 2 consists of three major steps, each detailed in this section. These include (a) tokenization, detailed in FIG. 6, (comprising segmentation, abstraction, stemming, and encoding), (b) construction of the Sentence Suffix Tree 15 (the "SST"), and (c) traversal and analysis of the SST, including application of the stop list. These steps together result in the construction of the candidate library of user phrases.

(I) Tokenization Techniques:

A. Segmentation

Segmentation of the source text involves its deconstruction into units, termed "word packs", each one representing a word. Segmentation is performed on a sentence-by-sentence basis. Upon reaching the end of a sentence, the word packs from that sentence are ready for the next stage of tokenization. The process breaks up the source text into both words and sentences in parallel, extracting words one by one until a sentence boundary is reached. A standard finite-state machine technique is used to recognize patterns that indicate word and sentence boundaries. This method is efficient, extensible, and simple.

As an example of segmentation, consider the following (schematic) sample sentence, in which each of the letters below represents a word in that sentence. Further, assume that the word represented by the letter "a" below has different conjugated instances, as indicated below:

A(starting with a capital letter) a(ending with "ing") x y a a f g a(ending with "s") c Segmentation divides the input characters in the source text into the sequence of words constituting this sentence, as a sequence of its component words. Once the complete sentence is produced, it is abstracted, as described below.

B. Abstraction

There are a variety of elements in a document that are known to be structural in nature and do not affect the meaning of the surrounding sequences of words. These elements include many different types of terms, including without limitation defined terms, references to certain sections, references to attachments and appendices, titles of related documents, names of persons party to or otherwise connected with the document and related documents, laws, rules, regulations, and many other proper nouns. None of these words serve to modify the meaning of the sequences of words preceding or following them. Thus, an analysis of a group of words containing any of these structural elements should proceed on the basis of, and is made more accurate by, normalizing these terms. Any term of a given type is functionally similar to any other term of the same type. Insertion of an abstraction marker for each type of structural element (indicating the position and type of the structural element) prior to the construction of the SST allows the analysis of the remainder of the words in the word group, whether these words are contiguous or are separated by the structural element. The abstraction process described here assumes that some other domain-dependent process has previously been applied to the source text, and that, for each type of structural element, a special "bracketing" character has been inserted at the start and at the end of each word sequence constituting an occurrence of that element type.

For example, assume the group of word packs tokenized from the above-provided sample sentence:

A(starting with a capital letter) a(ending with "ing") !x y! a a !f g! a(ending with "s") c where "!" is the special bracketing character for elements of type "b".

The abstraction step will represent each of these known structural elements of the same type with a constant variable, "b". The group of word packs has now been abstracted to the following set of word packs:

A(starting with a capital letter) a(ending with "ing") b a a b a(ending with "s") c

C. Stemming

Following the abstraction of the text, the word packs are passed through a stemming routine in order to arrive at the root, or "canonical" form of each word, other than the constant variables noted above. Treatment of the words in this canonical form removes from consideration any discrepancies with respect to capitalization, pluralization and conjugation. The now-stemmed word packs constitute the elements to be represented in the SST.

For example, assume the following additional information about the same sample phrase following segmentation:

A(starting with a capital letter) a(ending with "ing") b a a b a(ending with "s") c Stemming will eliminate conjugational discrepancies between all the uses of the root word represented by the letter "a", so that those starting with a capital letter and those starting with a lower-case letter, and those ending in "ing", those ending in no suffix, and that ending in "!" are all reduced to the canonical form, "a."

The stemmed, tokenized phrase now reads: a a b a a b a c

D. Encoding

Once the sentence has been tokenized, abstracted, and stemmed, each word is encoded as a unique integer. The encoding is done in order to reduce the cost of comparing words to one another in the suffix tree construction and analysis phases, as well as during phrase filtering. Encoding is accomplished by representing each word in a trie, as described in Section IV(2), above. Each word is associated with a unique integer. When a new word is encountered, if it is found to appear already in the trie, the integer associated with that word is used as its code. Otherwise, the word is inserted into the trie and is assigned a new code. An ancillary array is also maintained, which indexes nodes in the trie corresponding to words according to their assigned codes. The trie together with this "code index" is termed the "Word Index". Special markers, such as those associated with structural element abstractions, have predefined integer codes that are inserted directly. The sequence of words is thus converted to a sequence of integers, enabling words to be most efficiently compared to one another.

The set of word packs has now been completely preprocessed and is ready to be represented by, and analyzed in, the Sentence Suffix Tree.

(II) Determination of Phrases

A. Construction of the Sentence Suffix Tree

The sentence suffix tree utilized as a part of the overall process described herein is a specialized form of suffix tree, as noted in Section IV(1), above. In essence, a suffix tree for a given element is a method of representing every distinct sub-sequence of items constituting a suffix of that element. Were the general form of suffix tree utilized in the context of a document, the suffixes that the suffix tree would represent would be those of the entire document. In this context, the atomic units represented at each node on the tree would be stemmed word packs, not characters or character strings. Each leaf of the resultant suffix tree would represent a distinct suffix of the document as a whole. The use of the SST, as further detailed below, yields a different and more efficient result.

Early methods for the construction of suffix trees were relatively simple and the software relatively non-complex and therefore easily maintained, but were exceedingly slow. They constructed the suffix tree in quadratic time, meaning that the amount of time necessary to construct the tree is proportional to the square of the number of elements under analysis. For the purposes of this application, these methods are collectively termed Q Method.

The method operates by successively inserting each suffix into the tree in order: first the entire text, then the suffix starting from the second element, and so on. Each such sequence is inserted by finding the node in the tree constructed so far representing a prefix of the sequence, and then splitting the node to add a new child corresponding to the remaining portion of the sequence to be inserted.

The number of suffixes in a text is the same as the number of elements, and the time to insert each sequence is proportional to the length of the sequence. Hence, the time to construct this suffix tree would be:

$$T=O(n^2)$$

Where:

T=Time n=the number of elements in the document

This equation indicates that the time for construction using Q Method is a quadratic function of the number of words in the document. Because the suffix tree was created to handle problems that could be handled more efficiently, Q Method suffix trees were never known to be widely used. The use of suffix trees became practical and, in certain applications, widespread, as the methods for construction become more efficient. These methods include several methods, including that innovated by P. Weiner (Weiner, P. "Linear Pattern Matching Algorithms," Conference Record, IEEE 14th Annual Symposium on Switching and Automata Theory, pp. 1–11.) and improved by E. M. McCreight ( McCreight, E. M., "A Space-Economical Suffix Tree Construction Algorithm," Journal of the Association for Computing Machinery, Vol. 23, No. 2, April 1976, pp. 262–272.), as well as that developed by Ukkonen (Ukkonen, E. "On-Line Construction of Suffix Trees," Algorithmica, Vol. 14, No. 3, September 1995, pp. 249–260) ,that for the purposes of this application, are termed collectively the L Methods. These methods are much more efficient than the Q Method, as they are able to construct the tree in linear time. That is, the amount of time necessary to construct the tree is proportional to the number of elements under analysis. In the case of a document, this implies that the time to construct a suffix tree for the document as a whole would be proportional to the number of words in the document. Using the L Method, the construction time is given by:

$$T=O(n)$$

indicating the time for construction to be a linear function of the number of words in the document. However, the L method involves complex algorithms, difficult to implement and maintain. Therefore, the L Method was also deemed inappropriate for the purposes of the method that is the subject of this application.

(b) Method of Application

Figure 5:
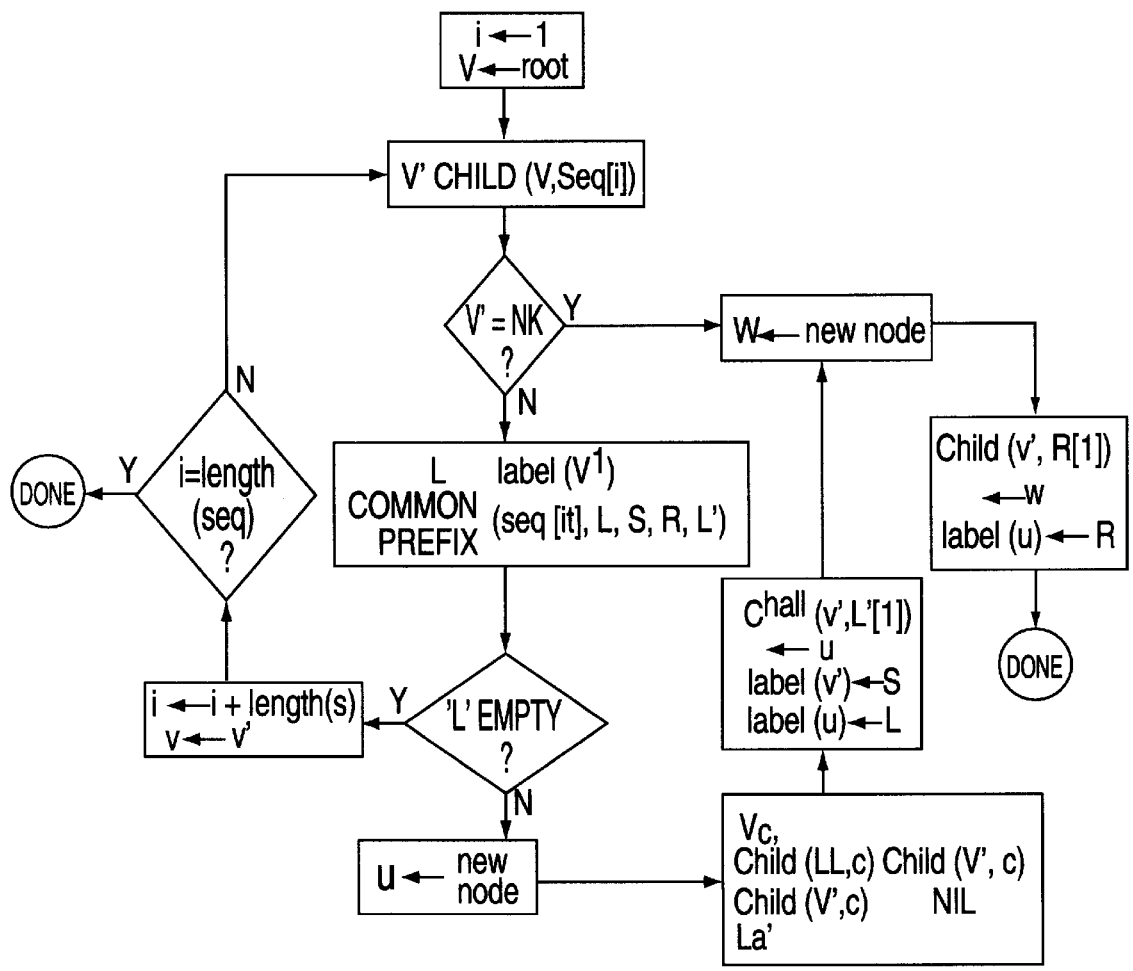
FIG. 5: Flow diagram details of Trie Sequence insertion.

The method described maximize the efficiency and speed of suffix tree construction while minimizing its complexity. This minimization of the complexity of construction is extremely desirable, as this allows the improvement of the maintainability and usefulness of the software. The innovative method detailed in FIG. 5 and described herein builds the tree using the steps and simplicity of the Q Method, but achieves efficiency close to the level enabled by the greater complexity of the L Method.

This unique combination is enabled by the specific nature of the elements under analysis—documents—and the atomic units chosen—words. The nature of the document permits a significant and innovative modification in the method described herein, termed the EE Method. The significant phrases sought for identification in a document cannot by definition span a sentence boundary; if a whole sentence is a standard phrasing, then that sentence becomes designated a phrase. As a result, the Sentence Suffix Tree, constructed as part of this application, represents not the distinct sub-sequences of words in the document as a whole, but rather only the distinct sub-sequences of words in each individual sentence. This markedly reduces the time for construction of this tree to:

$$T=O((s_1^2)+(s_2^2)+(s_3^2)+\ldots(s_f^2))$$

Where:

s=the number of words in a given sentence in the document f=the number of sentences in the document To simplify the equation, in the worst case scenario in a document with X sentences of length less than or equal to $s_{max}$, the maximum time (T) that it takes to build a suffix tree is represented by the following formula:

$$T=O(Xs_{max}^2)$$

This time compares favorably with the times that result from either of the suffix tree construction methods described above:

Q Method: $T=O(X^2 s_{max}^2)$

L Method: $T=O(Xs_{max})$

The following numbers illustrate this point:

Assume:

X=1000 The number of sentences in a document;

$s_{max}$=10 The number of words in each sentence in the document.

The different methods would take the following times:

Q Method: T=100,000,000 units of time

EE Method: T=100,000 units of time

L Method: T=10,000 units of time

The EE Method is sufficiently efficient to allow construction of a Sentence Suffix Tree in near-linear time, yet accomplishes this with the far lesser complexity associated with the Q Method. This optimal combination of efficiency and complexity is highlighted as increasingly large documents are examined. It is important to recognize that, as documents grow, their number of sentences (A) grows, but the length of a sentence remains constant ($s_{max}$). Therefore, as the only quadratic function in the EE Method is sentence length, which does not change with the length of the document, the time in the EE Method increases only linearly as the document grows in size.

(c) Method of Construction of the Tree

As noted above, the SST constructed using the EE Method represents every distinct suffix subsequence of words. Each word sequence (suffix of a sentence) is inserted individually into the tree as follows (see the detailed flowchart in FIG. 5). First, the tree is traversed from the root down in order to find the node with the longest corresponding word sequence which is a prefix of the current sequence (that to be inserted). If the node's sequence completes a prefix of the current sequence, a new child is added to that node, which child is labeled with the remaining suffix of the current sequence. Otherwise, the sequence corresponding to the node contains words beyond the corresponding prefix, and hence the node N must be split. This is done by creating a new node M, labeled with the first part of N's label (that contained in the prefix of the current sequence). N then becomes a child of M, and is labeled with the part of its old label remaining after M's label is removed. Then, the remaining suffix of the current sequence is inserted as a child of M, just as in the case where no splitting was required.

As the process proceeds, a counter is incremented at every node that is traversed, keeping track of the number of occurrences of each node's subsequence.

This process may be illustrated through the use of the example developed above. The sample word packs above, once tokenized, abstracted and stemmed, give the following sequence:

a a b a a b a c

The tree is constructed iteratively, starting from the first term in the sentence and moving forward. Considering the suffix of the first term, the tree would appear as follows:

At an intermediate point in the process, the following suffixes will have been inserted into the tree:

a a b a a b a c
a b a a b a c
b a a b a c
a a b a c

The tree at this point in the sentence would appear as follows:

Upon completion of the construction for the remaining suffixes, the following suffix tree would result:

Each node in this final sample tree represents distinct sub-sequences of words within the sentence, while each leaf represents a distinct suffix of a sentence. Beside each node is a number that represents the number of recurrences R of the particular word or set of words. The number of leaves is, at most, the number of words in the sentence. As a result, the maximal size of the tree is proportional to the size of the text as a whole.

As increasing numbers of sentences are examined by the EE Method, only incremental suffixes are added to the tree. Word sets and suffixes already contained on the tree are not added. Instead, a counter of the number of recurrences, R, is incremented.

B. Traversal and Analysis

As mentioned above, the SST constructed by the EE Method is used not for storage and compression, but rather for traversal and analysis, leading to the extraction of significant phrases. Analysis is based on two criteria that exist for the preliminary determination of qualification as a significant phrase, length of the phrase, L, and the amount of recurrence of the phrase, R. Only where both the criteria are met, i.e., where:

$$L \geq l_{min}$$

and $$R \geq r_{min},$$

is the word set at that node preliminarily considered a significant phrase.

L and R dictate the size of the phrase list found. In a typical document, as either parameter grows, the sets of words that qualify decrease. Where both these criteria are met, the set of words is determined, on a preliminary level, to be a significant phrase. The satisfaction of both these criteria is apparent upon traversal of the EE tree constructed. Where the number recording recurrence at each node is below the threshold $r_{min}$ the word set ending at that node, and all word sets below it on that branch, do not have sufficient recurrence to satisfy the criteria for significance as a phrase. Where the number of words at a given node and above it on that branch are not sufficient to satisfy the length criteria $l_{min}$, the word set ending at that node does not satisfy the criteria for significance as a phrase.

At any node on the tree where the recurrence level is below the threshold $r_{min}$, traversal of the branch(es) below that node ceases, as no node can have a higher recurrence level than its parent node. This improves the efficiency of phrase-finding via the SST, as the traversal is ended preemptively.

Additional efficiency is gained via examination of the criterion, L. At any node on the tree where the length is below the threshold $l_{min}$, the recurrence level need not be examined, as the word pack or set of word packs represented at that node do not meet the criteria for significance as a phrase. Traversal continues to the next node, to examine whether the word set contained on the node meets both criteria for significance as a phrase.

For example, in the sample tree reproduced here, assume the parameters for significance as a phrase are set as follows:

$$r_{min}=3$$

$$l_{min}=2$$

The R criteria is met by only the word set "a" on the top left branch of the tree. However, this word set lacks the minimum length. Therefore, at this point, two decisions are made. First, as even at their highest nodes, the other main branches off the root on which the word set "a" sits do not satisfy the R criterion, the suffixes at nodes below them cannot satisfy the R criterion. Therefore, these nodes are not examined at all for significance as phrases. Traversal is ended preemptively with respect to these branches, leading to efficiency.

Second, the main branch on which the word "a" sits must be traversed one further level to determine whether any word set does have sufficient L to satisfy $l_{min}$, while retaining sufficient R at least equal to $r_{min}$.

An additional feature of the traversal is the efficient filtering out of some nested phrases not satisfying certain criteria, as described in Section IV(2)(A) below.

C. Application of Stop List

An important point to note is that the word packs laid out on the suffix tree include certain minimal content words, comprising conjunctions, articles and prepositions. Were these words considered in the groups of word packs analyzed by the subject method, meaningless phrases consisting mostly of such function words might be found, incorrectly (such as "and whereas about the"). In order to account for this, the method that is the subject of this application integrates a technique used in information retrieval (and not typically in pattern matching), the application of a stop list of minimal content words. This stop list is applied during the traversal phase described above; stop words are ignored for computing the length of phrases. As a result, in order to satisfy $l_{min}$, a candidate phrase must contain a minimal number of content words.

Upon the completion of the traversal and analysis step, the preliminary list of candidate phrases is complete. It is then passed to the next phase described below.

3. Master Phrase Filtering Phase

Phrases included on the preliminary list of phrases noted above are filtered in order to eliminate repetitiveness among the phrases and, further, to improve the natural language veracity of the preliminary phrase list. First, the elimination of repetitiveness is necessary, as the preliminary phrase list may include certain phrases that contain, wholly within them, nested phrases that themselves are evaluated to be significant phrases. If these nested phrases always appear only as a part of the larger, nesting phrase, they should not be listed as separate entries on the final phrase list as distinct phrases. However, if they appear sufficiently on their own, independently of the larger nesting phrase, they should be included as significant phrases in their own right. Second, the phrases extracted in the traversal and analysis step described above may start or end with certain minimal content words that should not be considered parts of the phrase. To deal with this problem, certain dangling minimal content words are not included as part of the phrases contained on the final phrase list.

(1) Processing of Nested Phrases

A. Identification of Nested Phrases

The phrases determined by the aforementioned steps will include certain phrases that are wholly nested within other significant phrases. While these nested phrases may be significant phrases in their own right, they must also appear independently of their nesting phrases in order to avoid misleading duplication on the final phrase list. Two methods for locating nested phrases are used. First, as detailed below, phrases appearing as prefixes to other phrases may be immediately identified on the SST, at no extra cost in processing time. Second, non-prefix nested phrases are identified in a separate post-processing technique, described below. Once identified, these nested phrases are further processed in order to determine whether they meet additional criteria for inclusion on the final list of phrases.

The first type of nested phrases, prefix nested phrases, are those nested phrases meeting two definitional criteria:

1. they are contained wholly (i.e., "nested") within another significant phrase; and
2. their starting points coincide with the starting point of the nesting phrase.

For example, consider the sample set of word packs discussed above:

a a b a a b a c

Assume that the Master Phrase Finding Phase determined that each of the following two phrases are significant phrases, as follows:

P=Significant Phrase $P_1$=a a b a a b a $P_2$=a a b a a

The relationship between these two phrases may be denoted as follows:

$P_1$: XXXXXXXXXXXXXXXX $P_2$: XXXXXXXXXXXX $P_2$ is wholly nested within $P_1$, as a prefix. If $P_2$ never appears other than nested within $P_1$, its inclusion on the final list of phrases would result in unnecessary duplication on that list.

This determination is accomplished through the use of the SST and does not require a separate post-processing step. The traversal and analysis of the tree described above immediately evidences where a prefix phrase is nested within a larger phrase. For example, assume that the tree for $P_1$ and $P_2$ looks as follows, with the R for each beside the respective nodes:

It is apparent from this tree that $P_2$ is wholly nested within $P_1$. To determine whether both phrases or only the larger, nesting phrase should be included on the final phrase list, the additional processing described in the next section must be undertaken.

The second type of nested phrases, non-prefix nested phrases, are those nested phrases meeting two definitional criteria:

1. they are contained wholly (i.e., "nested") within another significant phrase; and
2. their starting points do not coincide with the starting point of the nesting phrase.

For example, suppose that the Master Phrase Finding Phase determined that each of the following three phrases are significant phrases, as follows:

P=Significant Phrase $P_3$=a a b a a b a $P_4$=b a a b $P_5$=a a b

The relationship between these three phrases may be denoted as follows:

$P_3$: XXXXXXXXXXXXX $P_4$: XXXXXXXXX $P_5$: XXXXXX $P_5$ is wholly nested within $P_4$ and $P_3$. Further, $P_4$ is wholly nested within $P_3$. If $P_5$ never appears other than nested within $P_4$, its inclusion on the final list of phrases would result in unnecessary duplication on that list. Similarly, if $P_4$ never appears other than nested within $P_3$, its inclusion on the final list of phrases would result in unnecessary duplication on that list.

Unlike the analogous determination with respect to prefix nested phrases, this determination may not be accomplished through the use of the SST. An additional post-processing step is necessary. The preliminary phrase list is sorted from longest through shortest phrase. Any phrase appearing on the list at a point below any other is therefore shorter than the above-listed phrase. In our example, the sorted list would appear as follows:

$P_3$=a a b a a b a $P_4$=b a a b $P_5$=a a b

Each candidate phrase P, in order, is then compared to each phrase P' below it in the sorted list. If P' is nested within P, then the test described below in Subsection B is applied to determine if P' should be retained or not. If it is determined that P' should not be retained, it is removed from the list immediately. The next section describes in more detail this testing process.

B. Elimination of Duplicative Nested Phrases

To be included on the final phrase list, nested phrases must be determined to be significant in their own right. This determination is accomplished through a second measure of recurrence, the residual $R_n$ for the nested phrase. Consider the two phrases first noted above, $P_1$ and $P_2$, where the recurrence of each is as follows for each:

$P_1$: $R=R_1$ $P_2$: $R=R_2$ $R_n = R_2 - R_1$ $R_n$ gives an indication of the independent significance of the nested phrase. If $R_n=0$, the nested phrase has no significance independent of the nesting phrase. Only if $R_n$ is equal to or greater than a second minimum is the nested phrase significant in its own right and therefore retained on the final phrase list, i.e., only where:

$$R_n \geq r_{m,min}$$

is the phrase retained on the final phrase list.

The measure of residual recurrence is incremental, i.e., where two or more phrases are nested in a larger nesting phrase, the residual recurrence of each of the nested phrases is measured.

The example of multiply nested phrases above illuminates this point. Consider the three phrases noted there:

$P_3$=a a b a a b c $P_4$=b a a b $P_5$=a a b

It is necessary to determine whether all three phrases, $P_5$, $P_4$ and $P_3$, only $P_5$ and $P_3$, only $P_4$ and $P_3$, or only $P_3$, the largest, nesting phrase, should be included on the final phrase list. Separate measures of residual recurrence must be taken for each. It is important to note that even if the intermediate nesting phrase, in this case $P_4$, is eliminated from the final phrase list for lack of sufficient residual recurrence, the phrase nested within it should not necessarily be eliminated. Assume the following measures for each of the following:

$P_3$: $r_3=4; l_3=7$ $P_4$: $r_4=5; l_4=4$ $P_5$: $r_5=6; l_5=3$

Where:

$r_{min}=3$ $l_{min}=2$

Each of these phrases, were they non-nested, would qualify as significant phrases in their own right. As they are nested, it is necessary to measure the residual recurrence, R, for each, to ensure they exceed the minimum residual recurrence, $r_{m,min}$:

$$r_{m,min}=2$$

The following results from the calculations:

$R_{m,5,4}=1$ $R_{n5,3}=2$ $R_{n4,3}=1$

Only $R_{n5,3}$ meets the minimum residual recurrence requirement. Note the resultant final phrase list.

$P_3$=a a b a a b c $P_4$=b a a b $P_5$=a a b

Although $P_4$ is eliminated, for lack of sufficient residual recurrence, the phrase further nested within it, $P_5$, is not eliminated. Note that $P_5$ is retained based on $R_{n5,3}$, which is only considered because $P_4$ was eliminated, as what is considered is the number of repetitions of a nested phrase independent of the most repeated containing phrase that is actually retained. Otherwise $R_{n5,4}$ would have been the operative number. This complex determination is performed automatically by the use of sequential elimination of nested phrases from the sorted list.

(II) Other Post-Processing

A. Elimination of Dangling Words

The final stage of post-processing the phrase list is the elimination of certain words dangling at the beginning or end of the significant phrases. These minimal content words, essentially articles, conjunctions and prepositions, are not thought of in natural language as part of a phrase, whether preceding or following. The method described herein eliminates these words from inclusion at the beginning or ends of phrases on the final phrase list. The final phrase list that results comprises unique user-defined phrases, without any dangling minimum content words (III) Final Phrase List The final phrase list generated by the process described above may be used for two purposes. First, the phrase list itself may be output to the user interface for the user to refer to for the purpose of standardizing later usages of similar phrases to the standard phrasing identified by the steps outlined earlier. Second, the phrase list is further processed in the following phases in order to facilitate a further standardization of phrasing. In particular, the final phrase list is utilized in the construction of the phrase dictionary that forms the basis of the identification of sets of words that are approximately similar, but not identical, to the phrases. This process is detailed below.

4. Candidate Phrase Finding (I) Introduction

The Final Phrase List generated above constitutes a list of phrases that are identical in all respects or near-identical, differing only in their usage of known structural elements. Each of the phrases contained on the Final Phrase List, as well as certain others that may be added manually, as described below, is termed a "Master Phrase." The second portion of the subject method seeks to identify phrases that differ to a more significant extent from a Master Phrase. These phrases, termed "Approximate Phrases," are substantially similar to one or more Master Phrases, yet may contain additional words, omit certain words, or replace certain words with other words. The process of identifying approximate matches involves two separate phases, the Candidate Phrase Finding Phase and the Candidate Phrase Confirmation Phase, each detailed in the sections below.

(II) Dictionary Structure

A. Construction of the Dictionary

The Master Phrases contained on the Final Phrase List are stored in a phrase dictionary, termed the "Dictionary," that includes two inter-related structures. The first structure in the Dictionary is a phrase list, termed the "Phrase List", which includes all the Master Phrases. These Master Phrases comprise two types of phrases. First, all those phrases contained on the Final Phrase List are entered on the Phrase List. Second, this list may be supplemented by manually input phrases. The latter phrases may be input either prior to usage of this system or in real time by the user.

The second structure in the Dictionary is a trie representing all the words that comprise the Master Phrases contained in the Phrase List. This second portion of the Dictionary is termed the "Phrase Index" and every word completed at a node of the Phrase Index is represented by a "Word Phrase List", or "WPL." Each WPL consists of a linked list of all the individual Master Phrases in which the word corresponding to the node appears.

Once constructed, this Dictionary forms the basis for the location of Approximate Phrases.

B. Construction of the Phrase Index

Prior to the construction of the Phrase Index trie, the individual words contained in the Master Phrases are put through a stemming process similar to the one described in Section IV(2)(C), above. In brief, each of the component words is passed through a stemming routine that reduces the word to its canonical form and therefore removes discrepancies of capitalization, punctuation and conjugation. The Phrase Index constructed here is constructed in the same way as the Word Index described in Section IV(2) above, by incrementally inserting the canonical form of each word in each Master Phrase into a trie. In addition, the Master Phrase involved is added to a linked list at each node corresponding to the inserted word, which list comprises the node's WPL.

(III). Identification of Candidate Phrases via Traversal of the Document

A. Efficient Searching for Approximate Matches

Searching directly for approximate matches in the entire document would be extremely inefficient, as the time required would be approximately proportional to the product of the size of the document and the total size of the Dictionary. Instead, to avoid the extremely time-consuming process of seeking approximately matching word sequences throughout a document, the subject method utilizes two steps to identify Approximate Phrases. The first step, Candidate Phrase Finding, seeks to quickly eliminate most of the word sequences in the document that could not qualify as Approximate Phrases; what remains at this point are only those candidate phrases that could potentially be sufficiently similar to the Master Phrases to constitute Approximate Phrases. The objective at this point is to identify those phrases that may qualify as Approximate Phrases in order to further process each and so conclude whether they are Approximate Phrases. The second phase constitutes the further processing of these candidate phrases to determine whether they are sufficiently close in wording to the Master Phrases to qualify for designation as Approximate Phrases.

B. Shifting Window Technique

In more detail, the objective of the Candidate Phrase Finding step is to examine all windows of text that could possibly contain an approximate match to some Master Phrase and to reject from further consideration as many sequences of text as possible, while ensuring that no window is rejected that actually does contain an approximate match. This is accomplished by only accepting as candidate sequences those sequences that contain at least some fraction of the words in some Master Phrase, represented by $w_{min}$ (P). Since only certain phrases with edit distance below a predefined threshold are allowed to be designated as Approximate Phrases, a significant number of words in the Master Phrase must occur substantially as is (including stemming, and equivalence of different occurrences of the same attribute) in any approximate match. By only considering sequences that contain at least that minimum number of phrase words, the amount of computation required can be substantially reduced.

In order to make the process of finding such candidate word sequences efficient, a "shifting window" technique is adopted. The efficiency is enabled by the incremental shifts of the window, as follows. Rather than consider every sequence of words contained in a window (a "windowed text") individually, the text is stepped through one word at a time, shifting the window by one word each step. Each time the window is shifted forward, one word is added to the current window, and one word is deleted. As a result, there is no need to analyze the entire windowed text anew each time; rather, just the effects of the incremented word and the decremented word must be considered.

For example, consider the following group of words, in which each word is represented by a letter:

$w_1\ w_2\ w_3\ w_4\ w_5\ w_6\ w_7$

Assume that the window is sized to enclose five words at a time and is shifted one word at a time. As the window is moved forward, it effectively adds one new word to the analysis, while also deleting a word from the analysis. At each of the following instances, the window will include the underlined text:

t=0: $\underline{w_1\ w_2\ w_3\ w_4\ w_5}\ w_6\ w_7$
t=1: $w_1\ \underline{w_2\ w_3\ w_4\ w_5\ w_6}\ w_7$
t=2: $w_1\ w_2\ \underline{w_3\ w_4\ w_5\ w_6\ w_7}$ As the window slides forward from t=0 to t=1, the word $w_6$ is added to the analysis, while the word $w_1$ is deleted. Similarly, as the window continues to slide forward from t=1 to t=2, the word $w_7$ is added to the analysis, while the word $w_2$ is deleted.

Clearly, the size of the window is an important factor in determining the number of words in any window that are potentially similar to the Master Phrases. The larger the window, the more words contained in it and therefore the larger the potential for similarity to the Phrase Index. In order to avoid both being so small as to be under-inclusive or being so large as to be over-inclusive, the size at which the window is set is to be slightly larger than the length of the longest phrase. At this size, the finding of a candidate phrase similar to even the longest Master Phrase is facilitated. The window is sized even larger than the longest Master Phrase in order to account for possible insertions.

C. Accumulation of Counts

Figure 4:
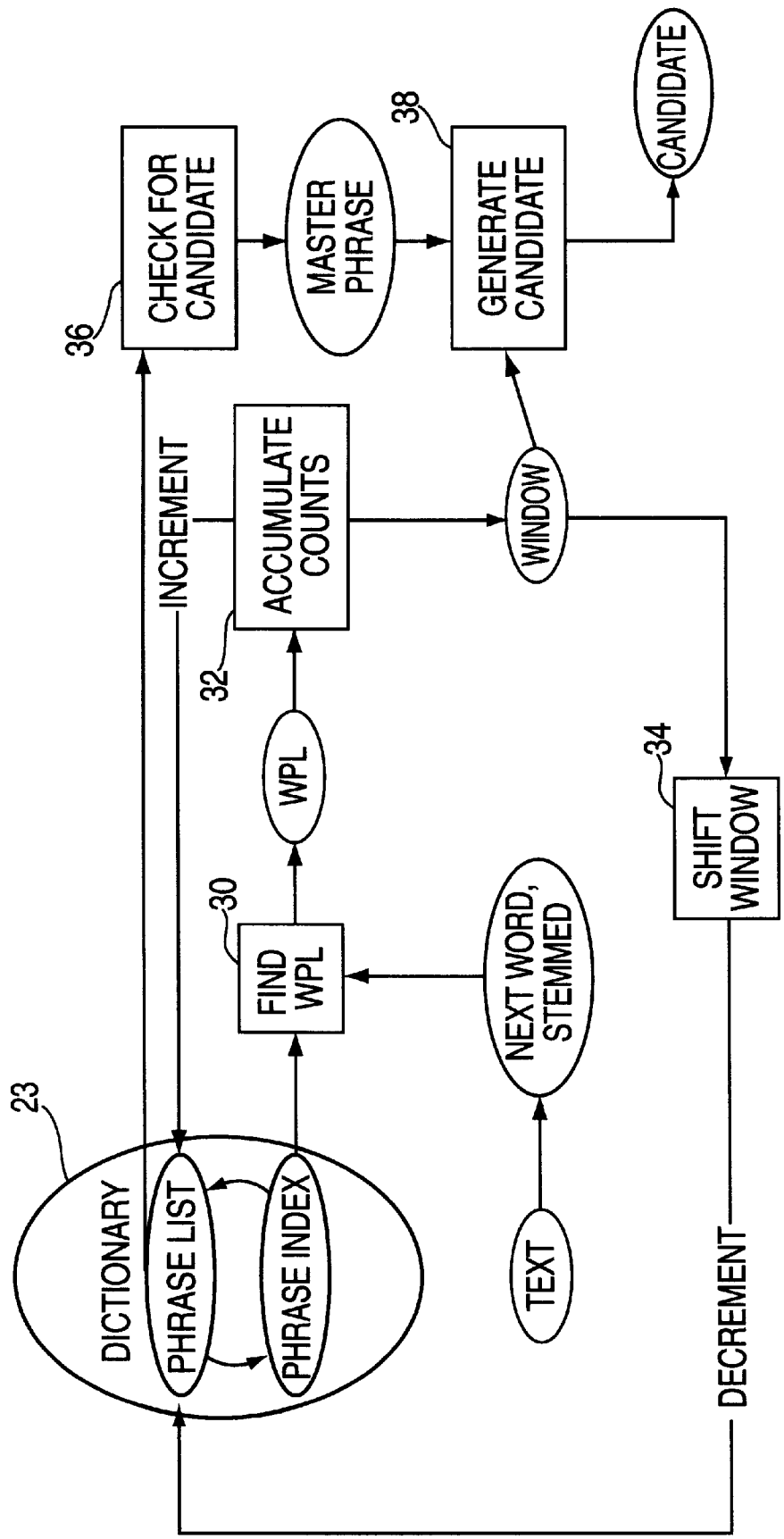
FIG. 4: Flow diagram details of Approximate Phrase Filtering.

The second step necessary for the identification of candidate phrases makes clear the benefit of this incremental windowing approach. In this second step, undertaken for each new word added to the window, the text contained in the window is compared to the Phrase Index to determine whether there are any words in some Master Phrase that appear in the windowed text and, if so, how many. The order of their appearance is immaterial, so long as the words appear in the windowed text. If the new word appears in a Master Phrase, a count is incremented for that Master Phrase and the window is shifted forward. Updating these counts is done by searching the Phrase Index using the stemmed version of the new word for a WPL; if such is found, the counts of all Master Phrases on the relevant WPL are incremented. If the deleted word appears in a Master Phrase, the count of that Master Phrase is then decremented. This is accomplished by storing the WPL for each position in the window; when the window is shifted, each Master Phrase in the WPL corresponding to the former first word in the window has its count decremented. Whenever the incrementation step results in a count higher than the threshold for matching words, a candidate match is generated, as described further below. Refer to FIG. 4 for a dataflow diagram depicting this process.

This process incrementally keeps track of the number of occurrences of words from the current window that are located in any relevant Master Phrase. This incremental approach enables great efficiency, since at any new location of the window, there need not be a comparison of the entire windowed text with the Phrase Index. As a result, the cost of the method increases only linearly with the size of the document and is not affected at all by the size of the window.

This point is clarified by return to the example above. As the window slides forward from t=0 to t=1, the word $w_6$ is added to the analysis, while the word $w_1$ is removed from consideration. Only the changes that relate to these two words must be considered in determining the potential candidacy of the windowed text as an Approximate Phrase. The remainder of the words in the window remain the same. If $w_1$ appeared once in the Phrase Index, upon the shifting of the window forward, the count of the number of words appearing in the Phrase Index must be decremented one. If $w_6$ also appears in the Phrase Index, the net affect of the shift of the window is 0. However, if $w_6$ does not appear in the Phrase Index, the net affect of the shift is the reduction by 1 of similarity to the Master Phrases. Similarly, if $w_1$ does not appear in the Phrase Index, the affect of the shift of the window is either 0, if $w_6$ also does not appear in the Phrase Index, or 1, if $w_6$ does appear.

A further efficiency gain may be realized in this step by comparing only the first n letters in the word to the WPL's in the Phrase Index. If those n letters match, even if it is unknown whether the remainder of the word matches, the word is considered to match with a WPL. This is possible without introducing errors, since this step in the subject method is oriented not to finding definitive Approximate Phrases, but rather only candidate approximate matches deserving of further processing via edit distance calculation. Determining how many characters to match in order to optimize processing speed is done by empirical testing on typical candidate documents.

D. Generation of Candidates

The third step in the processing is the determination of the sufficiency of the aggregate number of words from the windowed text appearing in the Phrase Index, W. Only if the aggregate number exceeds a minimum number of words is the windowed text determined to be a candidate match to be processed through the edit distance calculation. If the minimum is not met, the windowed text is not designated a candidate. Stated otherwise, only where the number of words meets the following criterion for some Master Phrase P:

$$W \geq W_{min}(P)$$

is the windowed text determined to be a candidate match. Any windowed text with $W \geq W_{min}(P)$ is designated a candidate match for Master Phrase P. Note that the threshold is a function of the Master Phrase P, since the number of matching words required depends on the length of the Master Phrase. Its starting location in the text is output for further processing in the edit distance calculation detailed in the next section.

Typically, $w_{min}(P)$ will be some fraction of the number of words in P. The product of this fraction and P yields the threshold, minimum number of words that must match for the edit distance between P and the text to fall below the minimum edit distance threshold, discussed further herein. This minimum, $w_{min}(P)$, is easily calculated by considering the maximum number of deletions that could occur in an allowed match.

5. Candidate Phrase Confirmation (I) Edit Distance Calculation

A. Introduction

In order to identify Approximate Phrases, it is first necessary to define more precisely what is meant by an approximate match of a phrase. The method herein defined uses a measure of approximate match based on the standard measure of "edit distance". In brief, the edit distance between a sequence of elements A and another such sequence B is the minimum number of insertions of elements, deletions of elements, and replacements of one element by a different element that are required to transform the sequence A into the sequence B.

Calculation of edit distance is the subject of much prior art. The particular method described in this application is based on that of Ukkonen, although other efficient methods exist. Among other things, this calculation is heavily utilized in character-based error finding, as in spelling checkers. This calculation enables rapid calculation of similarity between items and is typically used on the level of character strings, not words.

B. Unique Method of Current Process (a) Word-Level Representation

There are three central aspects of the subject method for edit distance computation. First, edit distance is calculated on the level of the word in order to determine the similarity of one word sequence to another, rather than on the level of the character to determine the similarity of one character sequence (i.e., a word) to another. Furthermore, comparison is carried out on the canonical forms of words, in order to properly account for morphological variation (such as pluralization). As noted above in Section II, this word based analysis is most appropriate both because the natural atomic units of phrases are words and because word-based analysis can be considerably faster than character-based analysis.

(b) Substitution of Conforming Phrase

Second, edit distance is not used in the subject method to recommend replacement of the object under analysis with a particular objectively correct item, e.g., the correct spelling of a word. In the context of phrasing there is not necessarily an objectively correct phrase. In theory, any phrasing might be correct and it is the user's preference that dictates the style chosen. As a result, the process of extracting approximately-similar phrases is oriented toward presenting the user with user-defined phrasing options for similar phrases, in which the user may opt to modify either phrase to suit the other, whether the Approximate Phrase to suit the Master, or the Master Phrase to suit the Approximate. Regardless of the option chosen, a similar amount of the original Phrase is retained, in order to preserve the syntactic coherence of the document.

(c) Weighting of Edit Distance

Tthe enhancement of the accuracy of the subject method is by the assignment of different costs and weights to the performance of operations in the course of determining edit distance. These costs and weights are assigned on the basis of several factors. These factors include, among others, the nature of the operation to be performed, the attributes of the object on which it is to be performed and the relationship of the object on which it is performed to any new objects introduced in the course of the operation. Each of these is detailed further, below. Overall, the edit distance in the subject method is not simply the number of operations performed on the item, but rather the sum of the costs of the performance of the operations.

The first (standard) factor is the nature of the operation. A different cost may be attached to each type of operation. Deletion, insertion and replacement may each be weighted differently, so that replacement may be a more expensive operation than insertion. For example, consider the following two phrases in which each letter represents a word:

$P_M$=Master Phrase $P_C$=Approximate Phrase $P_M$=a b c b $P_C$=a c b

Assume:

$C_D$=Cost of Deletion
$C_I$=Cost of Insertion
$C_R$=Cost of Replacement

Where $C_D$=1
$C_I$=1.5
$C_R$=2

$P_M$ may be converted into $P_C$ by replacing "b" with "c", and by deleting the following "c", as follows:

a b c b a c b

In this case, the cost of the operations, i.e., the edit distance, is 3. However, the same transition may be undertaken by simply deleting the "b" before the "c" as follows:

a b c b a c b

In this case, the edit distance is only 1, as there is only one deletion.

Second, the attributes of the object on which the object is being performed further dictates the cost of the operation. The attributes to be weighed into the calculation of edit distance include lexical attributes, syntactic attributes, structural attributes, and semantic attributes. Lexical attributes refer to the lexical significance of a given word; minimum content words have lesser significance and may be weighted accordingly. Syntactic attributes refer to the grammatical function of a given word, for example its part-of-speech (noun, verb, etc.). The cost of replacing one word by another may be weighted by reference to their respective syntactic attributes. Structural attributes refer to the structural significance of terms in a document (see Section IV(2)(B) above); certain known structural elements, though not insignificant, do not affect the context of the words preceding and following them. Semantic attributes refer to the semantic categorizations of certain terms, for example as company names, geographic locations or other proper nouns. These semantic categories are arranged in a hierarchy, where each such category defines a certain set of cost functions for the different editing operations performed on words of that type. For both structural and semantic attributes, domain-dependent methods for identifying these attributes are assumed. A second type of semantic attribute are synonym sets, where different terms are considered to have the same meaning. In any of these cases, the cost of a particular operation may be lowered or raised.

In general, any operation performed on a word, or pair of words, with a special attribute may be weighted differently than those performed on other words. For example, consider the following two phrases, in which $P_M$ is slightly modified from its form above to include a minimal content word, "q":

$P_M$=a b q c b $P_C$=a c b

Assume the method performs the same operations as those detailed in the second series of operations, those that led to an edit distance of 1. As the deletion of the additional word, "q," must also be calculated, the overall cost of all the operations would be:

$$ED=C_D+C_D$$

$$ED=2,$$

were no special weight attached to the deletion of "q."

However, by adding in additional weights related to the nature of the object operated upon, it is necessary to incorporate the following additional factor:

Assume:

$w_{MC}$=weighting of any operation on a minimal content word $w_{MC}$=0.5

In this case, $$ED=w_{MC}C_D+C_D$$

$$ED=1.5$$

By attaching additional weights to the nature of the object on which the operation is to be performed, the method is able to approximate the contextual affect of any change by reducing or inflating the cost of any given operation.

Third, the relationship between the object on which the operation is performed and any new objects introduced in the course of the operation may also be separately weighted. This enables the subject method to differently weight replacement of one word sequence possessed of a particular attribute with a second word sequence possessed of the same attribute. For example, consider the following two phrases, in which $P_M$ is slightly modified from its form above to include a word with the semantic attribute of being a company name, represented by "X," while $P_C$ is also modified from its form above to include a different company name "F."

$P_M$=a X b q c b $P_C$=a F c b

Assume the method performs the same operations as those detailed in the example immediately preceding, those that led to an edit distance of 1.5. The replacement of the company name, X, with the company name F must also be applied; were the standard cost of replacement applied, the additional cost of the procedure would be 2, as follows:

$$ED=C_R+w_{MC}C_D+C_D$$

$$ED=3.5$$

However, by adding in additional weights related to the relationship of the object being replaced to the new object it is being replaced by, another additional factor is incorporated:

Let:

$w_S$=Weight where the original and new objects are possessed of the same attribute $w_S$=0.1

In this case, $$ED=w_SC_R+w_{MC}C_D+C_D$$

$$ED=1.7$$

By attaching this additional weighting to the relationship between the original and new objects, the method is further able to model the semantic effect of a change by reducing or inflating the cost of any given operation.

In sum, the measurement of edit distance may be enhanced and made more reflective of the contextual impact of different operations. This enhancement is enabled by the assignment of weights to words, where those words are associated with attributes possessed by those words. As noted above, those attributes include, without limitation, lexical attributes, structural attributes, syntactic attributes, and semantic attributes.

C. Smallest Edit Distance Calculation

The candidate matches determined under the steps described above in Section 4 are not yet definitively Approximate Phrases. Rather, they are potential Approximate Phrases that must be further analyzed to determine whether they do, in fact, qualify as Approximate Phrases. This qualification is determined through the use of a calculation of "edit distance." In general, the calculation of edit distance for one item from a second item is a measure of the number of operations that must be performed on Item 1 in order to arrive at Item 2, as described above. For the purposes of this application, these operations include insertions, deletions and replacements, as further detailed below. The edit distance computation (herein the "EDC"), as detailed in this section, calculates the minimum edit distance between every "prefix" of the known element and the element under analysis. In this context, "prefix" means the components of the element under analysis that are positioned at the beginning of the element.

As noted, the EDC seeks to determine if the smallest edit distance between a given Master Phrase and some suffix of the text beginning at a particular location (the "candidate phrase") is less than some maximum threshold (called $D_{max}$). In order to calculate this minimal edit distance, the standard dynamic programming technique for calculating edit distance is used. Essentially, this algorithm computes solutions to a large problem by first computing solutions to small parts of the problem and then combining them incrementally into larger solutions to larger components of the problem until the entire large problem is solved. In this case, this amounts to determining the smallest edit distance between every "prefix" of any relevant Master Phrase and every prefix of the candidate phrase. For the purposes of this section, "prefix" means the sequence of words at the beginning of the subject text. The method for edit distance calculation described here is derived from that of Ukkonen, cited above.

The calculation of minimal edit distance is best demonstrated through the use of an example; the simple sample phrases below and the array at Table 1 are used to demonstrate this point. Assume that $P_M$ is a Master Phrase which $P_C$, the candidate phrase, may approximate. The Edit Distance Filter will determine whether the similarity between the two phrases is sufficient for the candidate phrase to be designated an Approximate Phrase.

$P_M$=a c b $P_C$=a b c b

Assume the following costs for each type of operation:

$C_D$=1

$C_I$=1

$C_R$=1.5

Assume that no additional factors are taken into account in determining edit distance.

The calculation can be expressed in the form of the array:

TABLE 1

Edit Distance Calculation Array

| $P_M/P_C$ | a | b | c | b |
|---|---|---|---|---|
| a | 0 → | 1 | 1 | 1 |
| | ↓ | | | |
| c | 1 | 1.5 | 1 | 2 |
| | ↓ | | | |
| b | 2 | 1* — | 2 | 1** |
| Minimal E.D.? | | ✓ | | ✓ |

This array represents the cumulative costs associated with the operations necessary to transform $P_M$ into $P_C$. The algorithm traverses the array of costs outlined above. Each move to a new cell, indicating an operation performed on the prefix of the Master Phrase stated in the left-most column, has a cost associated with it. At all times, the edit distance process seeks the move that incurs the smallest cost. Only if the minimal edit distance arrived at upon the conclusion of traversal is less than $D_{max}$ will the candidate phrase be designated an Approximate Phrase. The use of the array may be made very efficient, by first stopping calculation where all the possible moves out of a given cell will result in a minimal edit distance above $D_{max}$. In this case, the candidate phrase is known to not be an Approximate Phrase, as it lacks the necessary proximity of edit distance. Secondly, if information is processed column by column, only two full columns need to be retained, together with a list of the minimal cost matches found.

D. Traversal

The process of traversal will be made clear by the traversal of the array provided above. Starting in the upper left corner, at {a,a}, the cost associated with transforming "a" into "a" is 0, as no operation is necessary. Continuing to the right, at point {a, ab}, the cost associated with transforming "a" into "ab" is 1, as it requires the insertion of "b." This is a minimal cost move. An alternative move from the upper left corner, moving diagonally down one cell to the point {ac, ab} has an associated cost of 1.5, as "c" must be replaced with "b." As this cost is higher than the cost associated with the earlier mentioned move out of the upper left cell, it is not a minimal edit distance move and its route is therefore not considered further.

Returning to the aforementioned minimal cost move, a move to the right, the point at {a, abc} has an associated cost of 2, as it requires the further insertion of "c." This is not the minimal edit distance from there. Rather, the lower cost move is diagonally down to the point (ac, abc}, where there is no need for any operation, as the transformation of "ac" into "abc" requires only the previously-accounted-for insertion of "b." As there is no incremental cost, the cumulative edit distance remains 1. From that point, the lowest cost move is, once again, diagonally downward to the point {acb, abcb}, again requiring no additional operation, for the same reason. As a result, this move has no associated incremental cost, leaving the cumulative edit distance at 1. As this is the final prefix, i.e., the end of the Master Phrase, there are no further operations to consider along this route.

An alternative minimal cost move from the upper left corner, moving one cell down to {ac,a}, has an associated cost of 1 for transforming "ac" into "a," as this transformation requires the deletion of "c." This move, too, is the minimal edit distance move from the upper left cell. Continuing further down, the point at {acb, a} has an associated cost of 2, as it requires the further deletion of "b." This is not the minimal edit distance. Rather, a lower cost move is diagonally down to the point {acb, ab}. This move has no incremental cost, as there is no need for any operation. The transformation of "acb" into "ab" requires only the previously-accounted-for deletion of "c." As a result the cumulative edit distance at this cell remains at 1. As this is the final prefix of the Master Phrase, there are no further operations to consider.

The smallest edit distance is 1, and either a heuristic or user interaction may be utilized to determine which of the two candidate phrases, each with identical minimal edit distance, is selected as an Approximate Phrase. Note that the particular sequence of operations associated with each minimum cost cell is recorded, to assist in determining the proper substitution, as described below.

6. Computing the Approximate Phrase Substitution (I) Unique Method of Current Process A further innovation in the subject process relates to determining the proper substitution for a found Approximate Phrase. In most applications of edit distance, such as spelling correction, if an approximate match is found which should be substituted for, the substitution is simply the appropriate objectively correct element itself (in our case, this element would be the given Master Phrase). This is not possible when dealing with phrase substitutions for two main reasons. The first is caused by the possible appearance of the same Master Phrase in different morphological forms, such as different tenses (past, future) or with different pluralization. This is accounted for in the earlier Master Phrase Finding Phase by using canonical forms found by stemming, as described above. However, when deciding on the proper substitution for an approximate occurrence of a given Master Phrase, the grammatical form should conform to that of the given occurrence and not to the default canonical form given in the Master Phrase. Therefore, the most appropriate substitution is likely not the canonical form. The second difficulty is that Master Phrases typically contain some terms that can change from occurrence to occurrence, such as certain structural elements or semantic categories (e.g., company names). In such a case, the Master Phrase should be treated as a template, and the appropriate items from the Approximate Phrase found in the text should be substituted into the Master Phrase.

(II) Reversal of Edit Distance Operations

The process uses the record of editing operations computed during the EDC (see Table 1) in order to optimally transform the Approximate Phrase into an occurrence of the Master Phrase. Such a substituted occurrence is termed a "Conformed Phrase Occurrence". In this way, as much information is retained from the current Approximate Phrase as possible during the process, so as to retain linguistic structure. This process proceeds in two phases-the first computes an initial substitution, ignoring grammatical changes in insertions from the Master Phrase, and the second conforms grammatical usage, either automatically using natural language processing, or through interaction with the user. Note that if more than one match is found with minimal edit distance, the substitution process is carried out for all such matches, giving a set of possible Conformed Phrase Occurrences which are presented to the user so that the appropriate substitution is selected.

There are two inputs to the substitution process in addition to the given Master Phrase and Approximate Phrase. First is a record of the editing operations which transform the Master Phrase into the given Approximate Phrase, as given in the computed array. For example, the editing operations given by the array in Table 1 for the match marked as * are:

Replace(a,a) Delete(c) Replace(b,b) while for the match marked as ** the operations are:

Replace(a,a) Insert(b) Replace(c,c) Replace(b,b)

The second input consists of a list of the types of replacements that should be considered to be "Template Replacements", where the Approximate Phrase's terms should be retained. These types are particular kinds of lexical attributes (e.g., prepositions) structural elements (e.g., defined terms) or semantic categories (e.g., company names). Given this information, an initial substitution can be computed according to the following algorithm:

1. CPO←∅
2. i,j←0
3. FOR i←TO n; DO:

IF Op[i]=Insert(y), THEN: CPO[j]←y Increment j
IF OP[i]=Delete(x), THEN: Do nothing
IF OP[i]=Replace(x,y), THEN:
   IF x=y OR x,y is a Template Replacement, THEN: CPO[j]←x
   ELSE: CPO[j]←x Increment j 4. Output CPO In this algorithm OP represents the sequence of editing operations as defined above, and CPO contains the Conformed Phrase Occurrence to be output. Several other variables are used:

i indicates which editing operation is currently being considered;

j indicates which word in the Conformed Phrase Occurrence in currently being generated;

n gives the length of the sequence of editing operations;

x is a word from the Master Phrase y is a word from the Approximate Phrase

For example, if the Master Phrase is

"MGH Inc. will sell, transfer, or pledge" and the Approximate Phrase matched is

"XYZ Corp. has sold or pledged", the initial Conformed Phrase Occurrence will be "XYZ Corp. will sold, transfer, or pledged", provided that company names are recognized and defined as Template Replacements.

(III) Grammatical Conformation

This example shows the necessity for the second phase of substitution processing, that of Grammatical Conformation. There are two general methods that can be used. The simpler is to give the user the option to edit the initial Conformed Phrase Occurrence, to ensure that it is grammatically consistent. Words that have been substituted in from the Master Phrase are highlighted during this interaction (as shown in the example), so that the user is made aware of what elements are potentially in need of change.

The second class of methods relies on natural language processing to do much of the work of Grammatical Conformation automatically. Such a method would first identify the particular grammatical case of each word in the approximate phrase, for example that "sold" is the past tense of "sell". Then, syntactic rules are applied to determine how newly inserted or substituted words should be conformed. For example, in a list construction (such as "sold, transfer, or pledged"), all elements of the list should have the same grammatical case. Thus, in this case "transfer" would be transformed to its past tense form, "transferred".

What is claimed is:

1. A method of extracting phrases in a document, which comprise the steps of:

extracting phrases of a document to automatically create a preliminary list of extracted phrases;

filtering the preliminary list of extracted phrases to create a final list of extracted phrases;

extracting candidate phrases of the document which are similar to extracting phrases contained in the final list of extracted phrases;

confirming whether a candidate phrase of the document is sufficiently proximate to the extracted phrase to constitute an approximate phrase by calculating an edit distance of the candidate phrases based on two distinct cost functions, a first one relating to a semantic significance and role of a text of the document, and a second one elating to operations performed on the text of the document; and computing a phrase substitution to determine the appropriate conformation of one of the extracted phrase to the approximate phrase and the approximate phrase to the extracted phrase.

2. The method of extracting phrases in a document of claim 1, wherein the step of extracting phrases of a document further comprises tokenizing the document.

3. The method of extracting phrases in a document of claim 1, wherein the step of extracting phrases of a document further comprises constructing sentence suffix trees for determination of extracted phrases.

4. The method of extracting phrases in a document of claim 3, wherein the step of extracting phrases of a document further comprises traversing and analyzing each of said suffix trees.

5. The method of extracting phrases in a document of claim 1, wherein the step of extracting phrases of a document further comprises applying a stop list.

6. The method of extracting phrases in a document of claim 1, wherein the step of filtering the preliminary list of extracted phrases further comprises extracting prefix nested phrases.

7. The method of extracting phrases in a document of claim 1, wherein the step of filtering the preliminary list of extracted phrases further comprises extracting suffix nested phrases.

8. The method of extracting phrases in a document of claim 1, wherein the step of filtering the preliminary list of extracted phrases further comprises eliminating duplicative nested phrases from the final list of induced phrases.

9. The method of extracting phrases in a document of claim 1, wherein the step of filtering the preliminary list of extracted phrases further comprises post-processing of the extracted phrase.

10. The method of extracting phrases in a document of claim 1, wherein the step of filtering the preliminary list of extracted phrases further comprises eliminating dangling words.

11. The method of extracting phrases in a document of claim 1, wherein the step of extracting candidate phrases further comprises constructing a dictionary.

12. The method of extracting phrases in a document of claim 1, wherein the step of extracting candidate phrases further comprises constructing a phrase index.

13. The method of extracting phrases in a document of claim 1, wherein the step of extracting candidate phrases further comprises extracting candidate phrases by searching for approximate extracted matches.

14. The method of extracting phrases in a document of claim 1, wherein the step of extracting candidate phrases further comprises applying a shifting window of variable starting point, ending point, and size regardless of starting words of the candidate phase.

15. The method of extracting phrases in a document of claim 1, wherein the step of extracting candidate phrases further comprises accumulating counts.

16. The method of extracting phrases in a document of claim 1, wherein the step of extracting candidate phrases further comprises generating candidates.

17. The method of extracting phrases in a document of claim 1, wherein the step of confirming whether a candidate phrase of the document is sufficiently proximate to the extracted phrase further comprises computing a phrase conforming the approximate extracted phrase to the extracted phrase.

18. The method of extracting phrases in a document of claim 1, wherein the step of confirming whether a candidate phrase of the document is sufficiently proximate to the extracted phrase further comprises computing a phrase conforming the extracted phrase to the approximate extracted phrase.

19. The method of extracting phrases in a document of claim 1, wherein the step of confirming whether a candidate phrase is sufficiently proximate to the extracted phrase further comprises weighting an edit distance.

20. The method of extracting phrases in a document of claim 1, wherein the step of extracting phrases of a document is performed without using a pre-stored dictionary.

* * * * *